(12) United States Patent
Wurzer et al.

(10) Patent No.: US 8,534,613 B2
(45) Date of Patent: *Sep. 17, 2013

(54) EXPANSION JOINT FOR A CABLE TRAY APPARATUS FOR A PEOPLE MOVER SYSTEM

(76) Inventors: Terry D. Wurzer, Carroll, IA (US);
Adam J. Wurzer, Carroll, IA (US);
Cameron G. Lewis, Ames, IA (US);
David T. Wurzer, Carroll, IA (US)

( * ) Notice: Subject to any disclaimer, the term of this patent is extended or adjusted under 35 U.S.C. 154(b) by 302 days.

This patent is subject to a terminal disclaimer.

(21) Appl. No.: 12/927,347

(22) Filed: Nov. 12, 2010

(65) Prior Publication Data
US 2012/0068024 A1    Mar. 22, 2012

Related U.S. Application Data

(63) Continuation-in-part of application No. 12/807,934, filed on Sep. 17, 2010.

(51) Int. Cl.
| *F16L 3/00* | (2006.01) |
|---|---|
| *F16L 3/08* | (2006.01) |
| *F16L 3/22* | (2006.01) |
| *E04G 3/00* | (2006.01) |
| *A47H 1/14* | (2006.01) |
| *A47F 5/00* | (2006.01) |
| *H02G 9/00* | (2006.01) |
| *H01R 4/00* | (2006.01) |
| *H02G 3/06* | (2006.01) |

(52) U.S. Cl.
USPC ............... 248/49; 248/65; 248/70; 248/68.1; 248/274.1; 248/288.11; 248/258; 174/39; 174/72 R; 174/72 C

(58) Field of Classification Search
USPC ............ 248/49, 65, 70, 68.1, 274.1, 288.11, 248/258; 174/39, 72 R, 72 C
See application file for complete search history.

(56) References Cited

U.S. PATENT DOCUMENTS

| 4,969,400 | A | * | 11/1990 | Burg et al. ................... 104/247 |
|---|---|---|---|---|
| 5,224,672 | A | * | 7/1993 | Testart ...................... 246/415 R |
| 6,143,984 | A | * | 11/2000 | Auteri .......................... 174/68.3 |
| 6,498,296 | B2 | * | 12/2002 | Benito-Navazo ............ 174/68.3 |
| 6,889,443 | B2 | * | 5/2005 | Polk, Jr. ........................... 33/562 |
| 7,113,685 | B2 | * | 9/2006 | Ferris et al. .................... 385/134 |
| 7,145,079 | B1 | * | 12/2006 | Henry ............................ 174/101 |
| 7,250,574 | B2 | * | 7/2007 | Fox .................................. 174/95 |
| 7,470,859 | B1 | * | 12/2008 | Gretz ........................... 174/72 A |
| 7,562,629 | B2 | * | 7/2009 | Lohr et al. ...................... 105/72 |
| 7,762,042 | B2 | * | 7/2010 | Packard, III ................... 52/848 |
| 8,119,914 | B2 | * | 2/2012 | Lubanski ........................ 174/97 |

(Continued)

*Primary Examiner* — Terrell McKinnon
*Assistant Examiner* — Christopher Garft
(74) *Attorney, Agent, or Firm* — Dennis L. Thomte; Thomte Patent Law Office LLC

(57) ABSTRACT

An expansion joint is disclosed for a cable tray apparatus for a people mover system. An expansion joint is inserted or positioned between a pair of generally rectangular electrical cable trays having first and second ends. The cable trays are connected in an end-to-end relationship. The expansion joint has first and second ends and is positioned between the pair of cable trays so that the first end thereof is connected to the second end of the adjacent cable tray and so that the second end thereof is connected to the first end of the adjacent cable tray. The expansion joint includes body portions which are slidably movable towards one another or slidably movable away from one another to compensate for expansion and contraction of the cable tray apparatus.

5 Claims, 19 Drawing Sheets

(56) References Cited

U.S. PATENT DOCUMENTS

| | | | |
|---|---|---|---|
| 2003/0116682 A1* | 6/2003 | Finco et al. | 248/49 |
| 2008/0023478 A1* | 1/2008 | Cahill | 220/375 |
| 2008/0283291 A1* | 11/2008 | Makwinski et al. | 174/481 |
| 2010/0133390 A1* | 6/2010 | Lange et al. | 248/65 |
| 2010/0155133 A1* | 6/2010 | Makwinski et al. | 174/481 |
| 2011/0303797 A1* | 12/2011 | Daub et al. | 248/49 |

\* cited by examiner

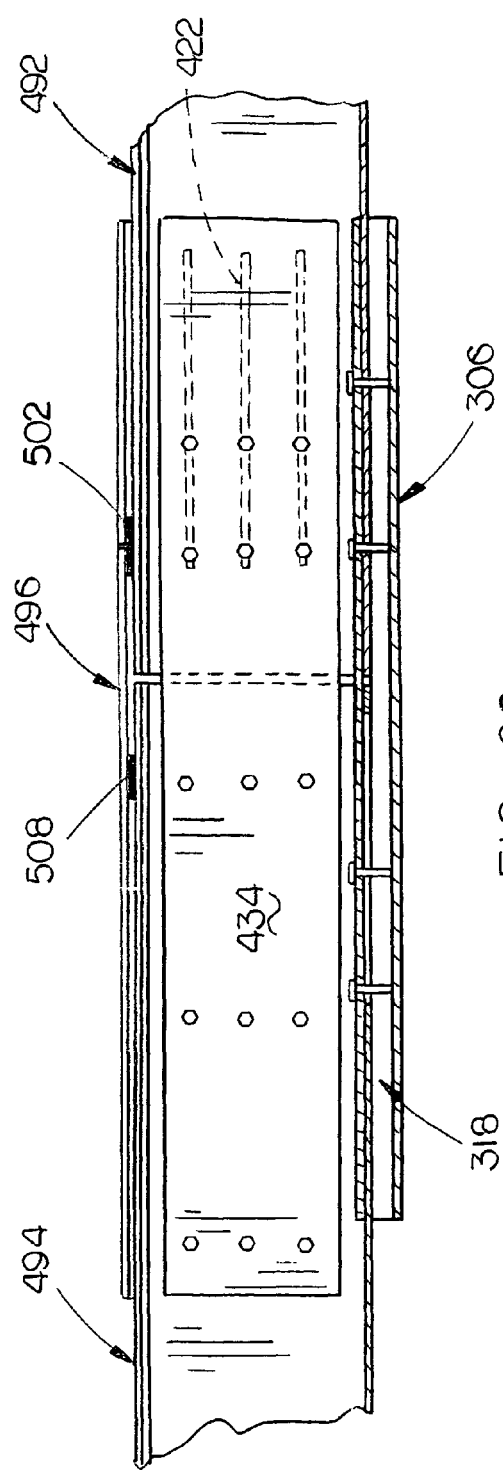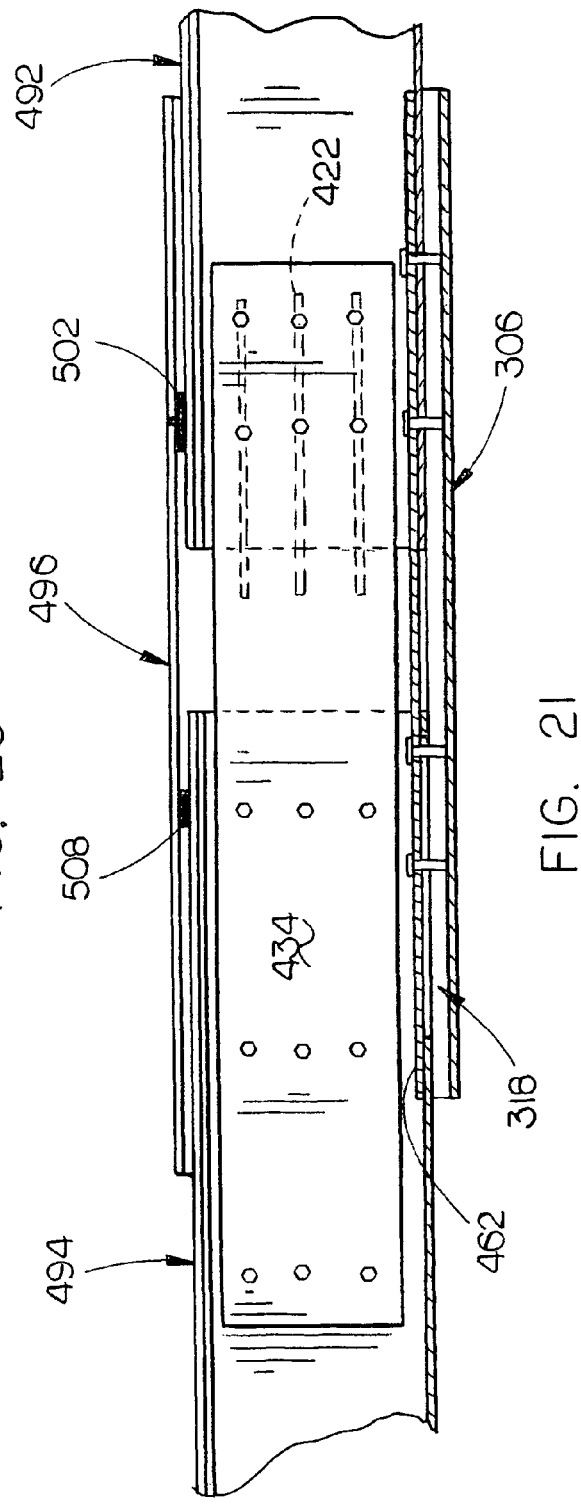

US 8,534,613 B2

EXPANSION JOINT FOR A CABLE TRAY APPARATUS FOR A PEOPLE MOVER SYSTEM

CROSS-REFERENCE TO RELATED APPLICATION

This is a continuation-in-part of the application entitled A CABLE TRAY APPARATUS FOR A PEOPLE MOVER SYSTEM, U.S. application Ser. No. 12/807,934, filed Sep. 17, 2010.

BACKGROUND OF THE INVENTION

1. Field of the Invention

This invention relates to an expansion joint for a cable tray apparatus for use with a people mover system such as a Sky Train or the like. Even more particularly, this invention relates to an expansion joint which is positioned between a pair of cable trays with the expansion joint being selectively laterally horizontally adjustable with respect to the adjacent cable trays and selectively vertically adjustable with respect to the adjacent cable trays.

2. Description of the Related Art

In people mover systems such as a Sky Train system, a plurality of vehicles or cars travel along a guideway or roadway with the guideway or roadway being normally elevated. Power and control signals for the cars normally comprise cables positioned in trays which are positioned on the roadway on one side of the cars traveling on the roadway. Prior to the invention of the co-pending application, it is believed that the cable trays had to be cut and welded together to accommodate curves in the roadway and to accommodate elevational changes in the roadway.

The cable trays of the co-pending application were designed to be secured to one another in an end-to-end relationship with the cable trays being selectively laterally horizontally adjustable with respect to one another and being selectively vertically adjustable with respect to one another to correspond to curves in the roadway and to correspond to elevational changes in the roadway respectively.

It has been found that it is necessary to provide expansion joints or expansion joint cable trays at spaced locations along the cable tray system to compensate for temperature changes. For example, in Phoenix, Ariz., the cable tray system could be subjected to very high daytime temperatures and quite low night time temperatures. Expansion and contraction of the cable tray system may cause damage to the cable trays in the system.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An expansion joint is disclosed for use with a cable tray apparatus for a people mover system. In the system, a plurality of generally rectangularly electrical cable trays, having first and second ends, are connected together in an end-to-end relationship. At least one generally rectangular cable tray expansion joint, having first and second ends, is positioned between a pair of cable trays so that the first end thereof is connected to the second end of the adjacent cable tray and so that the second end thereof is connected to the first end of the adjacent cable tray.

The cable tray expansion joint comprises a generally horizontally disposed rectangular bottom support member having a bottom wall, an upstanding first side wall, an upstanding second side wall, a first end and a second end. A flat slider plate comprised of Nylon or the like is positioned on the bottom wall and is secured thereto. A plurality of first threaded studs extend upwardly from the bottom wall through the slider plate inwardly of the first end of the bottom wall. A plurality of second threaded studs extend upwardly from the bottom wall through the slider plate inwardly of the second end of the bottom wall. The expansion joint includes a generally horizontally disposed rectangular first body portion having a bottom wall, an upstanding first side wall, an upstanding second side wall, at least one upstanding partition between the first and second side walls, a first end and a second end. The first end of the first body portion is secured to the second end of the adjacent cable tray. The first body portion has a plurality of longitudinally extending slots formed in the bottom wall thereof inwardly of the second end of the first body portion. The second end of the first body portion is longitudinally slidably mounted on the slider plate by the first threaded studs extending upwardly through the slots in the bottom wall of the first body portion. The expansion joint also includes a generally horizontally disposed rectangular second body portion having a bottom wall, an upstanding first side wall, an upstanding second side wall, at least one upstanding partition between the first and second side walls, a first end and a second end. The second end of the second body portion is secured to the first end of the adjacent cable tray. A first end of the second body portion is fixedly mounted on the slider plate by the second threaded studs extending upwardly through the bottom wall of the second body portion. The partition of the second body portion has a plurality of longitudinally extending slots formed therein inwardly of the first end of the second body portion. A first vertically disposed flat connector plate having first and second ends has its first end fixedly secured to the partition of the first body portion. The second end of the connector plate is longitudinally slidably secured to the longitudinally extending slots formed in the partition of the second body portion.

A first cover plate is selectively removably secured to the first body portion for movement therewith which extends between the upper ends of the first and second side walls thereof between the first and second ends thereof. A second cover plate is selectively removably secured to the second body portion for movement therewith which extends between the upper ends of the first and second side walls thereof between the first and second ends thereof. A third cover plate is secured to the second body portion at the first end thereof which is positioned on the second cover plate and which extends from the first end of the second body portion over the first cover plate to cover any gap between the first and second body portions caused by expansion and contraction of the cable trays of the system.

In the preferred embodiment, the expansion joint also includes flat plates, having first and second ends, with the first end of the flat plates being secured on the upper surface of the bottom wall of the first body portion with the first threaded studs extending upwardly therethrough. The second end of the flat plates are positioned on the upper surface of the bottom wall of the second body portion with the second studs extending upwardly therethrough. Nuts are secured to the upper ends of the first and second threaded studs to prevent the cables extending therethrough from being damaged by the studs.

It is therefore a principal object of the invention to provide an expansion joint for the cable tray apparatus for a people mover system.

A further object of the invention is to provide an expansion joint for a cable tray apparatus which is inserted between a pair of cable trays and which is selectively laterally horizontally adjustable with respect to the adjacent cable trays and which is selectively vertically adjustable with respect to the adjacent cable trays.

A further object of the invention is to provide an expansion joint for a cable tray apparatus for a people mover system which would be positioned between a pair of cable trays of the cable tray apparatus.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1 is a partial perspective view illustrating the cable tray apparatus of the co-pending application which is positioned adjacent a people mover system such as a sky train or the like;

FIG. 20 is a partial sectional view illustrating the first and second body portions in their contracted position; and FIG. 21 is a view similar to FIG. 20 except that the first and second body portions have moved away from one another.

DESCRIPTION OF THE PREFERRED EMBODIMENT

Figure 1:
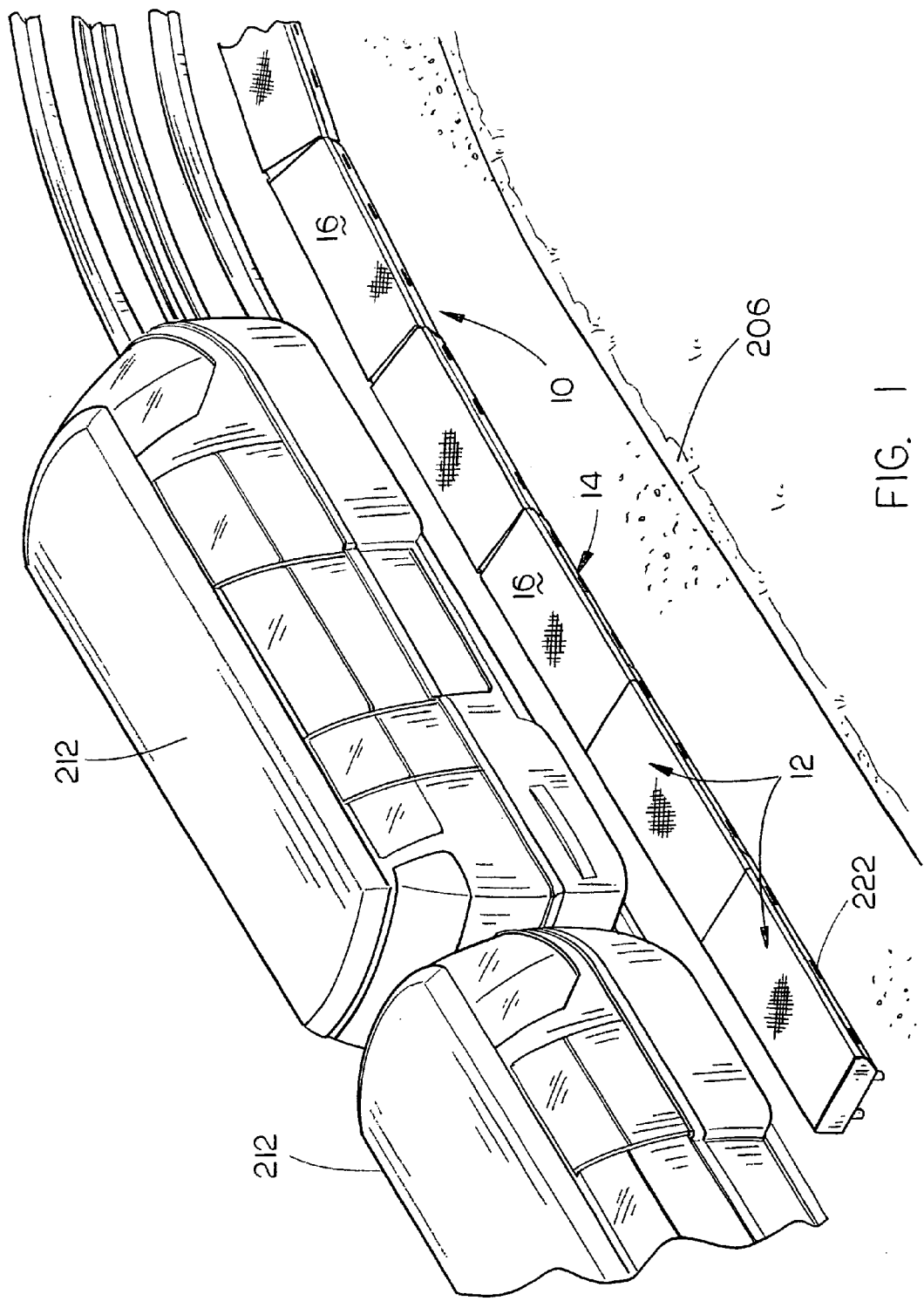

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The cable tray apparatus of the co-pending application (FIGS. 1-11) is referred to generally by the reference numeral 10 which is comprised of a plurality of elongated cable trays 12 which are secured together in an end-to-end manner so as to be selectively horizontally laterally adjustably secured together and so as to be selectively vertically adjustably secured together. Each cable tray 12 includes a body portion 14 and a cover 16 as will be described in more detail hereinafter. Preferably, the body portion 14 and the cover 16 are comprised of an aluminum material.

Each body portion 14 includes opposite ends 16 and 18. Each body portion 14 includes a bottom wall 20, an upstanding side wall 22 having an inwardly extending flange 24 at its upper end. Flange 24 is provided with notches 26 and 28 at its opposite ends. A plurality of horizontally spaced-apart, internally threaded screw openings 30 are formed in flange 24 along the length thereof. If the screw openings are not internally threaded, a small nut is secured to the underside of flange 24 at each of the openings 30.

Body portion 14 is also provided with a side wall 32 which includes an angularly disposed wall portion 34 and a vertically disposed wall portion 36 which has an inwardly extending and horizontally disposed flange 37 at its upper end which has a plurality of horizontally spaced-apart, internally threaded screw openings 39 formed therein along the length thereof. If the screw openings 39 are not internally threaded, a small nut is secured to the underside of flange 37 at each of the openings 39. Wall portion 36 has a slot 40 formed therein which extends thereinto at end 16 and a slot 41 formed therein which extends thereinto at end 18. Bottom wall 20 has slots 42, 44, 46, 48 and 50 formed therein which extend inwardly thereinto at end 16. Side wall 22 has slots 52 and 54 formed therein which extend inwardly thereinto from end 16. Wall portion 34 has a plurality of horizontally spaced-apart openings 56 formed therein along the length thereof to permit wires or cables to be extended therethrough.

Slots 58, 60 and 62 extend inwardly into bottom wall 20 at end 18 which are aligned with slots 42, 44 and 46 at end 16 respectively. Slots 64 and 66 extend inwardly into bottom wall at end 18 which are aligned with slots 48 and 50 respectively. Slots 68 and 70 extend inwardly into side wall 22 at end 18 which are aligned with slots 52 and 54 respectively.

Figure 5:
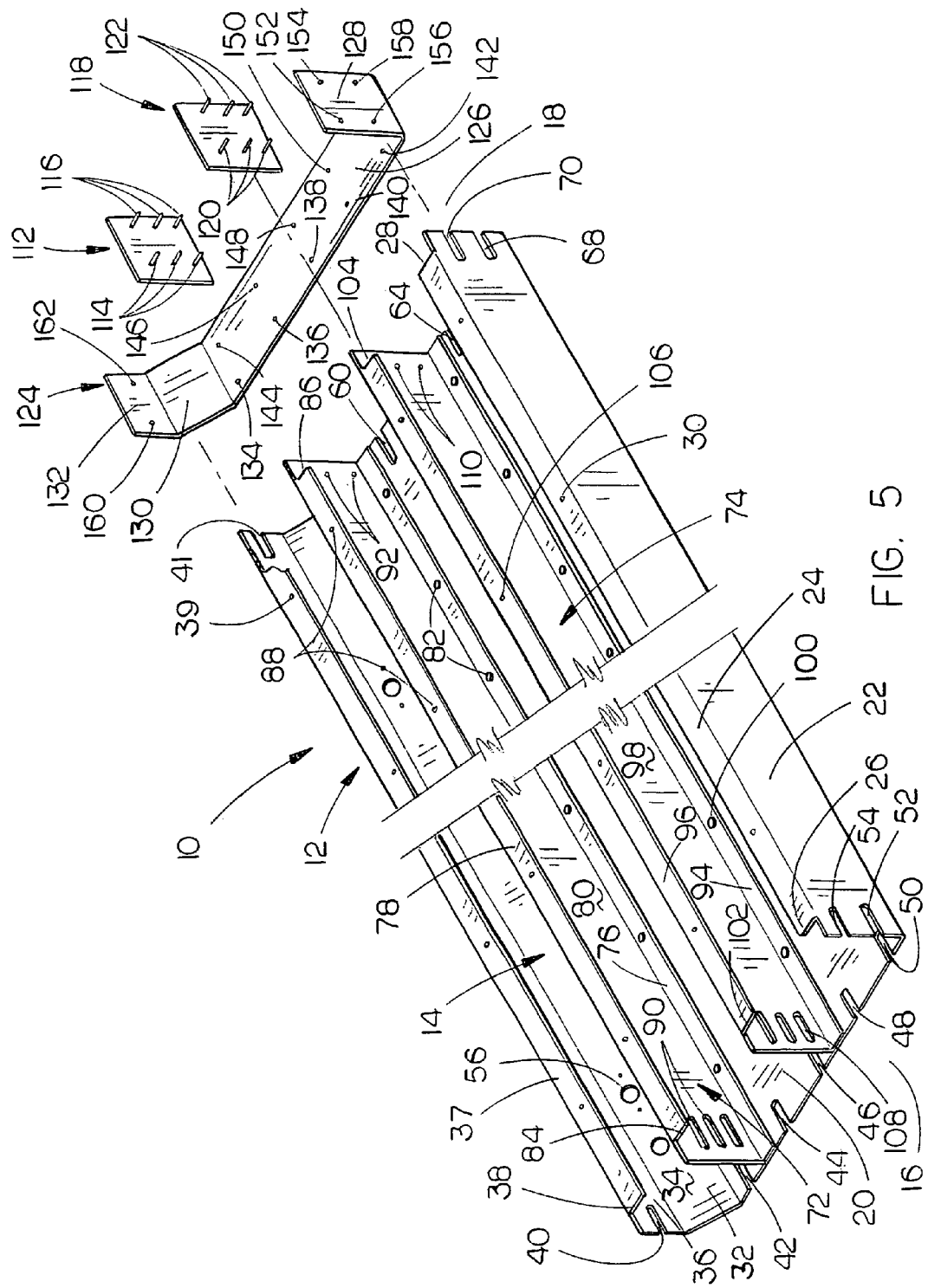
FIG. 5 is a partial exploded perspective view of the body portion and connector plates of one of the cable trays of the co-pending application.

A pair of spaced-apart upstanding partitions 72 and 74 are secured to bottom wall 20 between side walls 22 and 32 as seen in FIG. 5. Although two partitions are illustrated, any number of partitions could be utilized. Partition 72 is channel-shaped in cross-section and includes a bottom flange 76, a top flange 78 and a web 80 extending therebetween. Bottom flange 76 is secured to bottom wall 20 by a plurality of screws or rivets 82. Top flange 78 has notches 84 and 86 formed therein at its opposite ends. Top flange 78 is provided with a plurality of horizontally spaced-apart, internally threaded openings 88 formed therein. If the openings 88 are not internally threaded, a small nut is secured to the underside of flange 78 at each of the openings 88. A plurality of vertically spaced-apart slots 90 are formed in web 80 inwardly of one end thereof. A plurality of vertically spaced-apart openings 92 are formed in web 80 at its other end.

Partition 74 is channel-shaped in cross-section and includes a bottom flange 94, a top flange 96 and a web 98 extending therebetween. Bottom flange 94 is secured to bottom wall 20 by a plurality of screws or rivets 100. Top flange 96 has notches 102 and 104 formed therein at its opposite ends. Flange 96 is provided with a plurality of horizontally spaced-apart, internally threaded openings 106 formed therein. If the openings 106 are not internally threaded, a small nut is secured to the underside of flange 96 at each of the openings 106. A plurality of vertically spaced-apart slots 108 are formed in web 98 inwardly of one end thereof. A plurality of vertically spaced-apart openings 110 are formed in web 98 at its other end.

The numeral 112 refers to a flat connector plate having a plurality of vertically aligned threaded studs 114 extending therefrom which are adapted to be received by the openings 92 in partition 72 and maintained therein by nuts in conventional fashion. Connector plate 112 also includes a plurality of vertically aligned threaded studs 116 extending therefrom which are adapted to extend through the slots 90 in the partition 72 of body portion 14 of a cable tray 12 positioned in an end-to-end relationship thereto and maintained therein by nuts in conventional fashion. The numeral 118 refers to a flat connector plate having a plurality of vertically aligned threaded studs 120 extending therefrom which are adapted to be received by the openings 110 in partition 74 and maintained therein by nuts in conventional fashion. Connector plate 118 also includes a plurality of vertically aligned threaded studs 122 extending therefrom which are adapted to extend through the slots 108 in the partition 74 of body portion 14 of a cable tray 12 positioned in an end-to-end relationship thereto and maintained therein by nuts in conventional fashion.

The numeral 124 refers to a connector plate which has the same general configuration, without flanges, as body portion 14 and which includes a bottom wall 126, side wall 128, angular side wall portion 130 and vertically disposed side wall portion 132. Bottom wall 126 of connector plate 124 has internally threaded bolt or screw openings 134, 136, 138, 140 and 142 formed therein adjacent one side edge thereof and internally threaded bolt openings 144, 146, 148, 150 and 151 (not shown) formed therein adjacent the other side edge thereof as seen in FIG. 5. Side wall 128 of connector plate 124 has internally threaded bolt or screw openings 152, 154, 156 and 158 formed therein as also seen in FIG. 5. Side wall portion 132 of plate 124 has internally threaded bolt or screw openings 160 and 162 formed therein. If the openings are not internally threaded, small nuts are secured to the outer sides of bottom wall 126, sidewall 128 and side wall portion 132 at each of the above-described openings.

Figure 6:
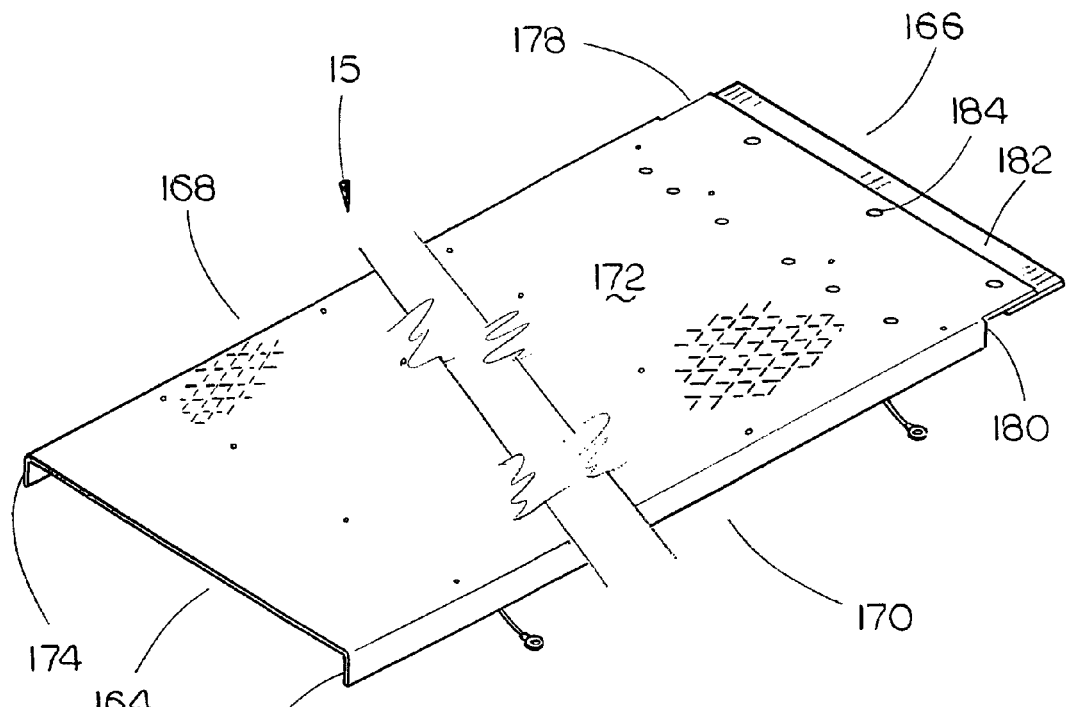
FIG. 6 is a partial top perspective view of the cover portion of the cable tray of the co-pending application.
Figure 7:
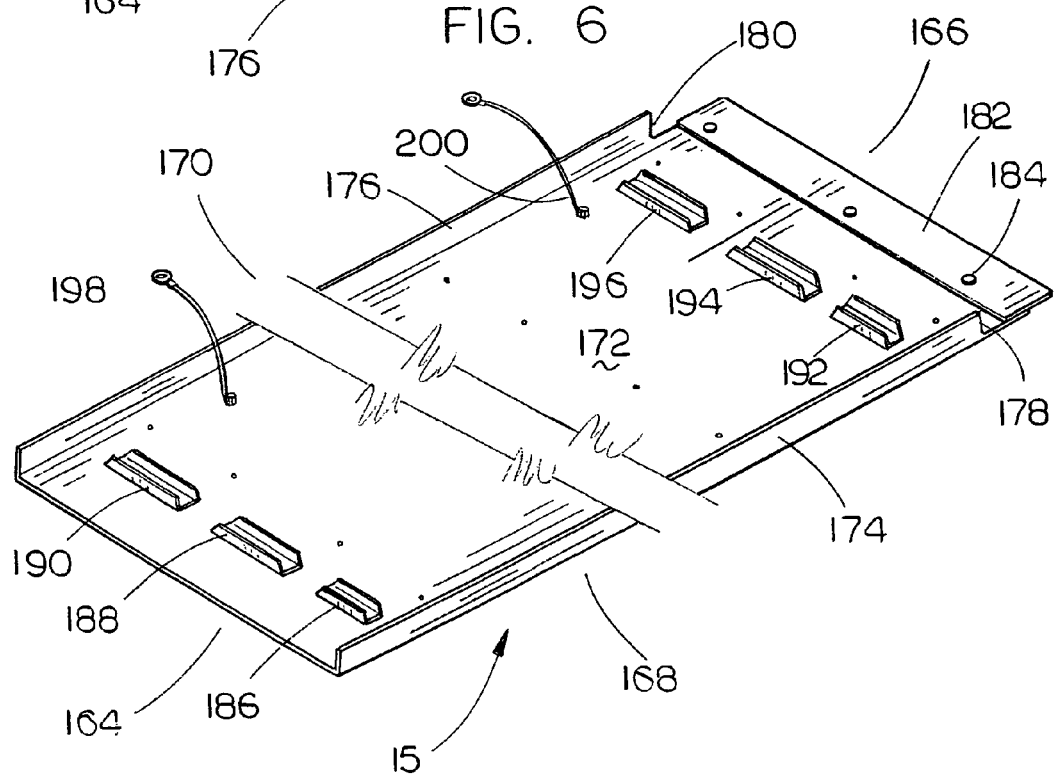
FIG. 7 is a partial bottom perspective view of the cover of FIG. 6.
Figure 8:
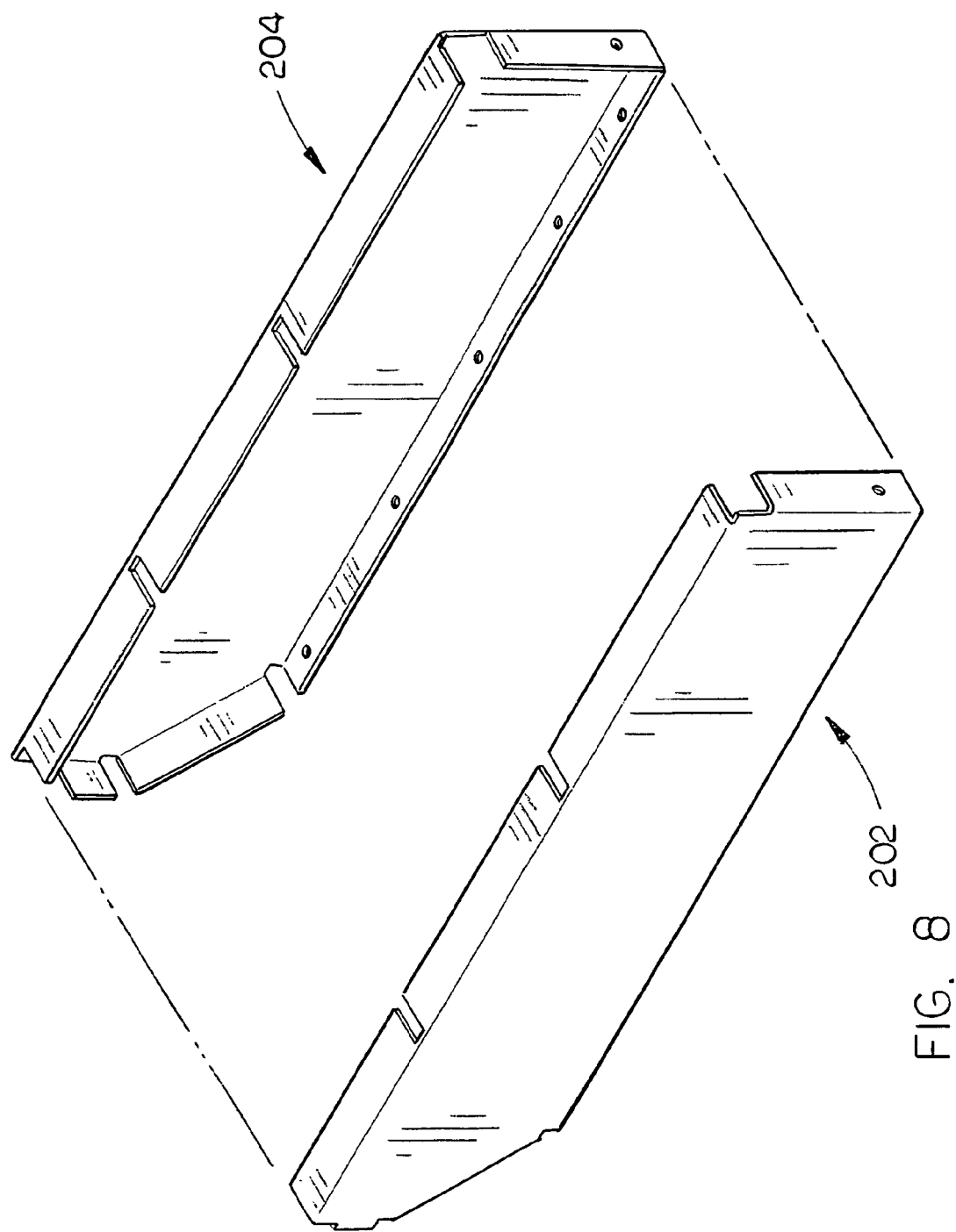
FIG. 8 is a perspective view illustrating a pair of end caps for use with the cable tray apparatus of the co-pending application.

Cover 15, as seen in FIGS. 6 and 7, will be described as having opposite ends 164, 166 and opposite sides 168 and 170. Cover 15 includes a top wall 172 having side walls 174 and 176 extending downwardly therefrom at the opposite sides thereof. Side walls 174 and 176 have notches 178 and 180 formed therein respectively adjacent end 166 of cover 15. A flat rectangular plate 182 is secured to top wall 172 at end 166 of cover 15 by screws 184 so that plate 182 extends horizontally outwardly from the underside of top wall 172.

Elongated U-shaped brackets 186, 188 and 190 are secured to the underside of top wall 172 inwardly of end 164 of cover 15 in a spaced-apart relationship by screws. Elongated U-shaped brackets 192, 194 and 196 are secured to the underside of top wall 172 inwardly of end 166 of cover 15 in a spaced-apart relationship by screws. A third set of elongated U-shaped brackets are secured to the underside of top wall 172 between the first and second set of elongated U-shaped brackets.

A pair of flexible tethers 198 and 200 is secured at one end thereof to top wall 172 at the underside thereof by screws or the like. The other ends of the tethers 198 and 200 are secured to the inside surface of side wall 22 by screws, bolts or the like.

Cover 15 is selectively removably secured to body portion 14 of tray 12 by screws extending downwardly through top wall 172 into the openings 39 in flange 37, openings 88 in flange 78, openings 106 in flange 96 and openings 30 in flange 24. The numerals 202 and 204 refer to end caps which may be secured to the ends of the cable tray apparatus 10 as needed or required.

Figure 9:
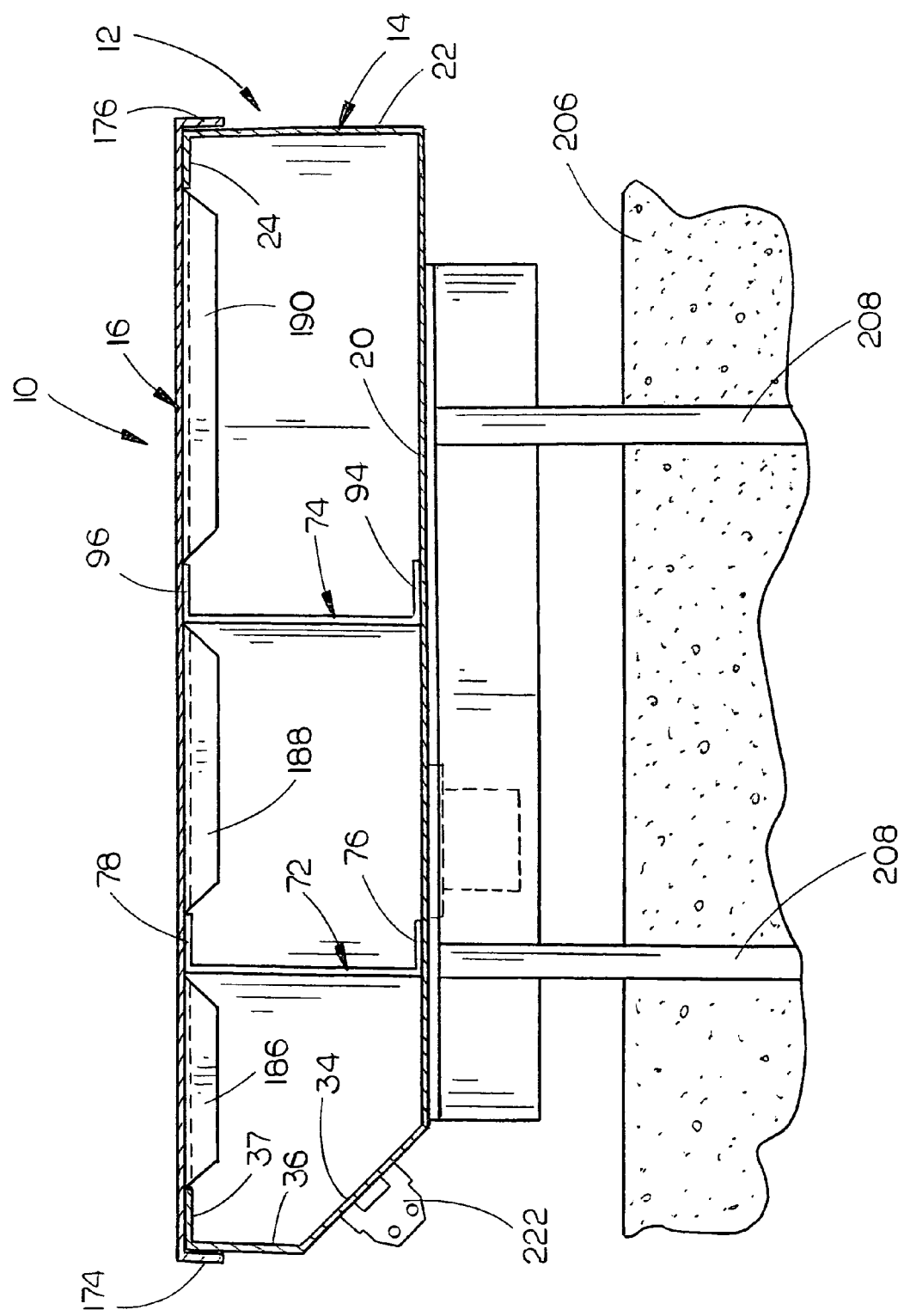
FIG. 9 is a vertical sectional view of one of the cable trays of the co-pending application.

The cable tray apparatus 10 of the co-pending application is designed to be utilized with a people mover system such as the Sky Train being constructed in Phoenix Ariz. The people mover system, for which the cable tray apparatus of the co-pending application has been designed, includes a roadway 206 which will generally be elevated. The cable trays 12 are supported above the roadway 206 by means of a plurality of vertically disposed supports 208 which have their lower ends embedded in the roadway 206 as seen in FIG. 9 and which extend upwardly therefrom. The upper ends of supports 208 are secured to angle braces 210 which extend transversely across the bottoms of the cable trays 12 and which are secured thereto.

Figure 2:
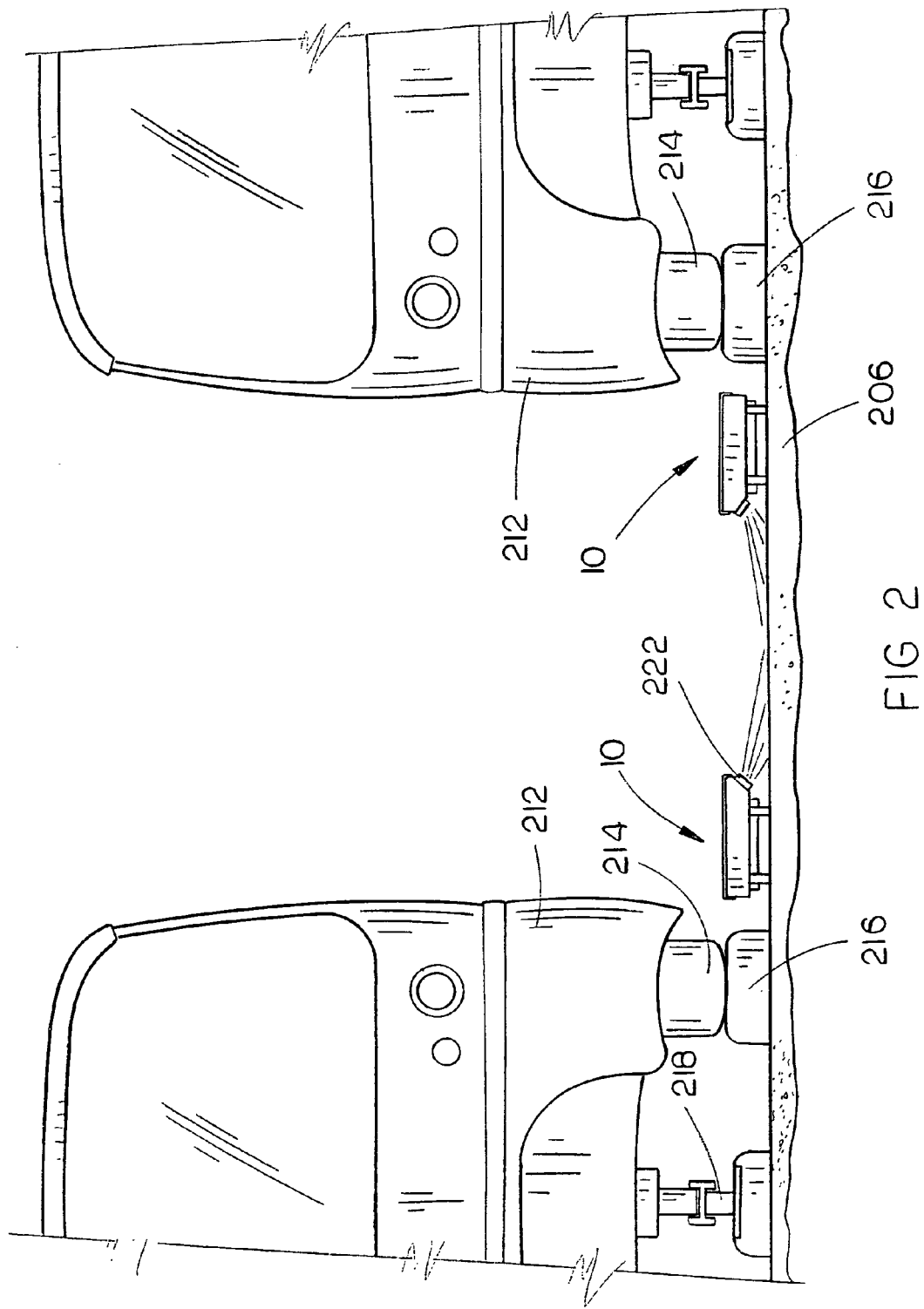
FIG. 2 is a partial front view of a pair of people mover vehicles positioned on an elevated roadway with a pair of the cable tray apparatuses of the co-pending application positioned therebetween.
Figure 3:
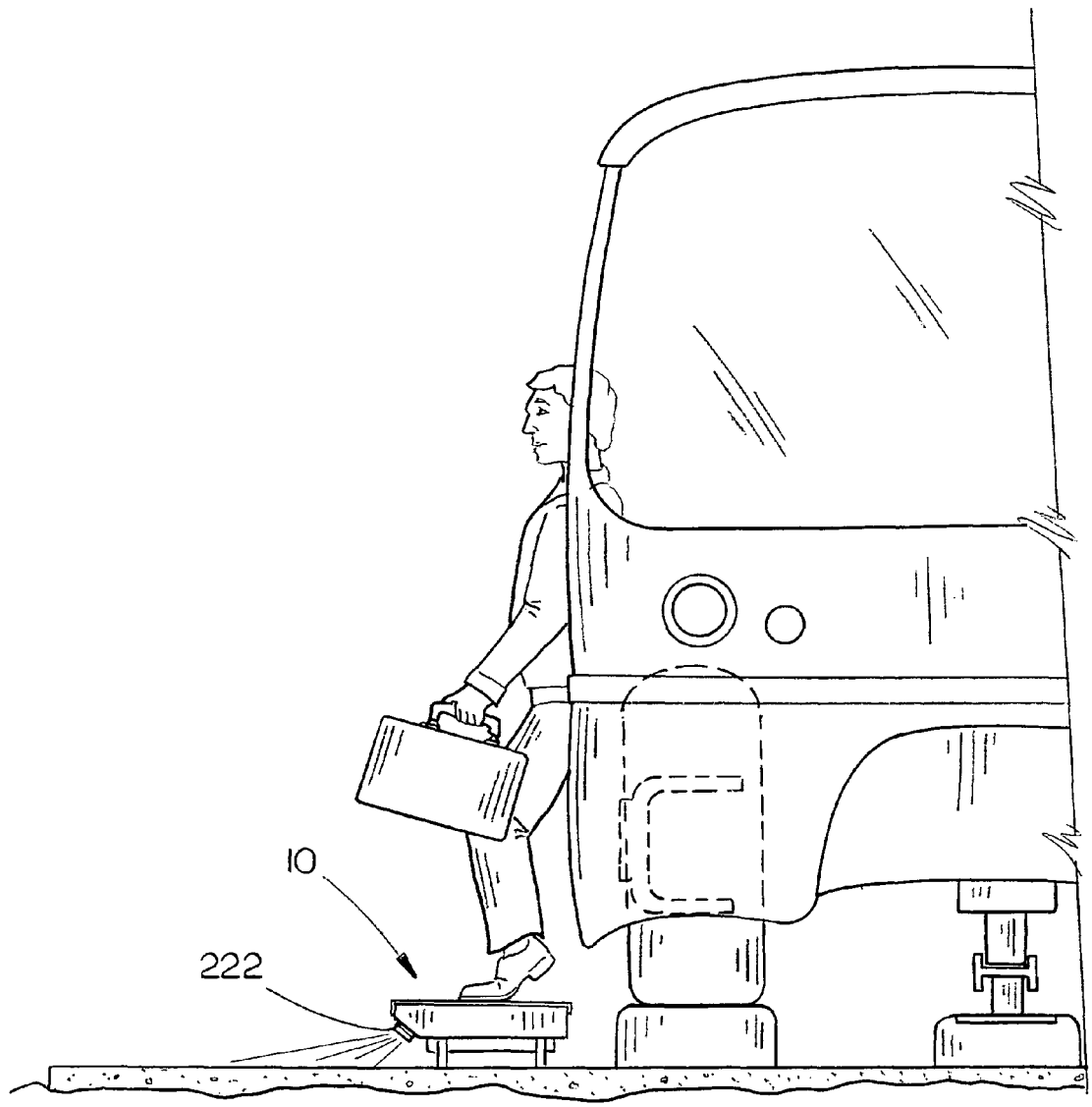
FIG. 3 is a partial front view illustrating a person stepping from the vehicle onto the cable tray apparatus of the co-pending application.
Figure 4:
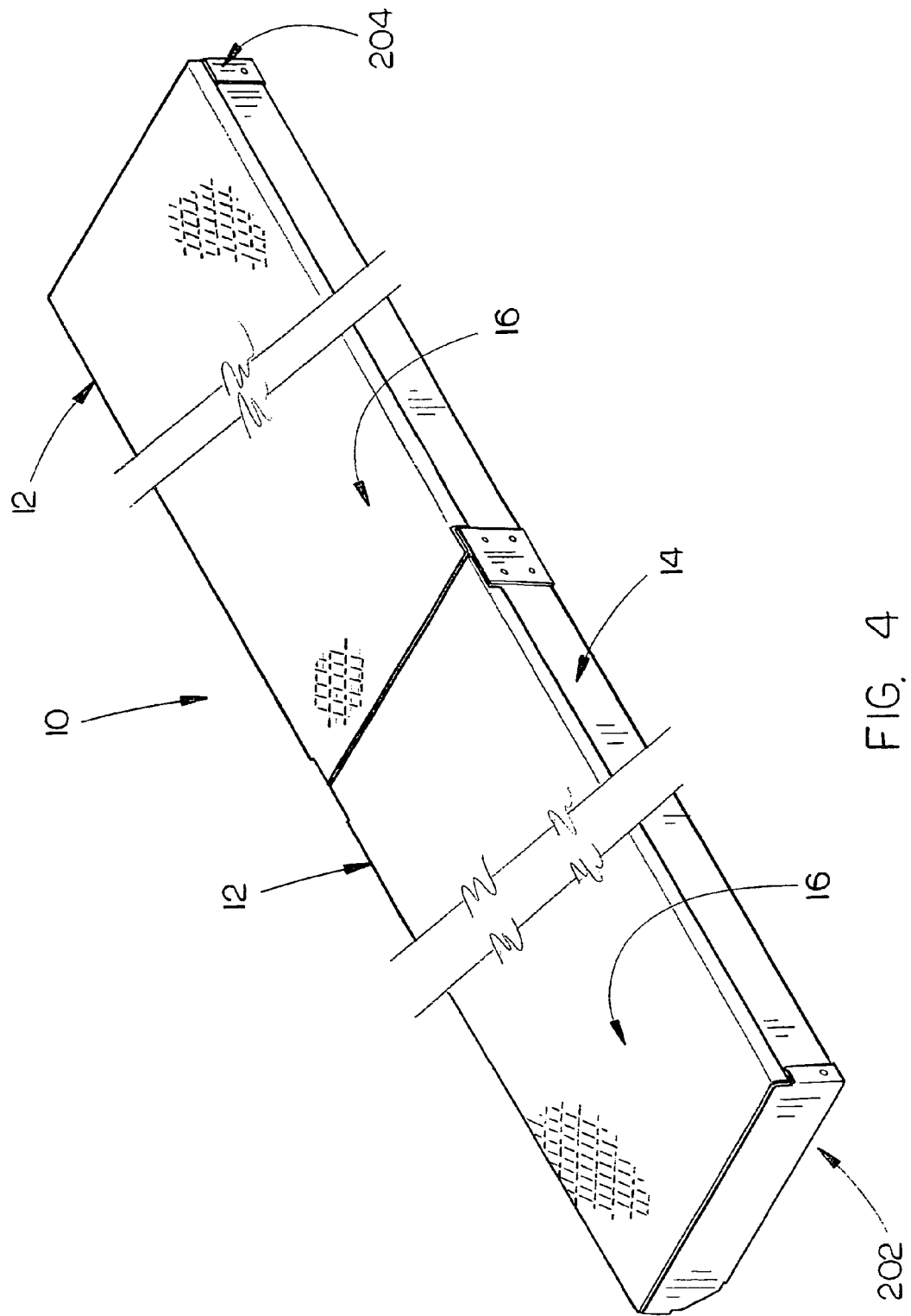
FIG. 4 is a partial perspective view of the cable tray apparatus of the co-pending application.

The cable tray apparatus of the co-pending application is designed, as stated above, to be used with the Sky Train people mover system being constructed in Phoenix, Arizona. The cable tray apparatus 10 will be supported on the roadway 206 at one side of the vehicle or car 212. Two of the cable tray apparatuses may be positioned between a pair of the vehicles 212 as illustrated in FIG. 2 or at one side of the vehicle 212 as seen in FIG. 1. The vehicles 212 have guide wheels 214 which roll along tire running surfaces 216 in conventional fashion. A guidebeam 218 is supported by roadway 206 between the surfaces 216. An electric power rail is associated with guidebeam 218 to provide power to the vehicle and to provide signals to the vehicle. A low voltage power conduit is positioned within body portion 14 outwardly of partition 72 for supplying low voltage to the lights 222 which are secured to the outer surface of wall portion 34 of body portion 14. A high voltage power conduit will be positioned in body portion 14 between side wall 22 and partition 74. A central signal conduit is positioned between partitions 72 and 74. The upper surface of cover 15 of the cable tray apparatus forms sidewalks for passenger use should the vehicle become disabled and stop at any point along the roadway.

The tethers 198 and 200 permit the cover 15 to be placed in an upside-down manner next to the cable tray should entry into the cable tray 12 be necessary. The tethers prevent the cover 15, when removed, from being blown from the roadway 206 and possibly injuring someone. The partitions 72 and 74 not only provide stability to body portion 14 and cover 15 but also act as heat sinks. The U-shaped brackets 186, 188, 190, 192, 194 and 196 not only provide strength to the cover 15 but also stabilize the side walls of body portion 14 and partitions 72 and 74.

Figure 10:
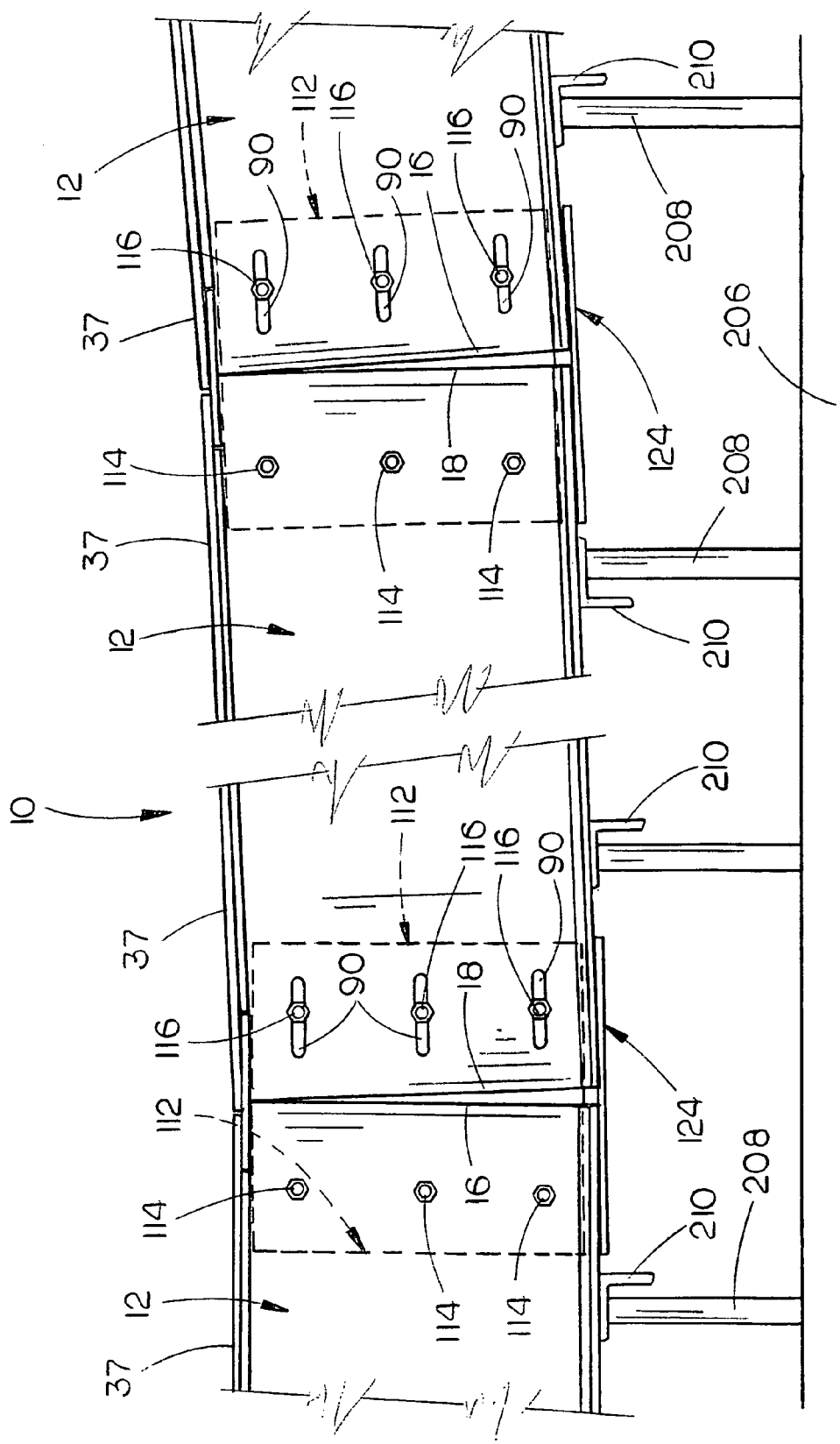
FIG. 10 is a partial vertical sectional view of the cable tray apparatus of the co-pending application illustrating the manner in which the adjacent cable trays are selectively vertically adjustably mounted with respect to one another.
Figure 11:
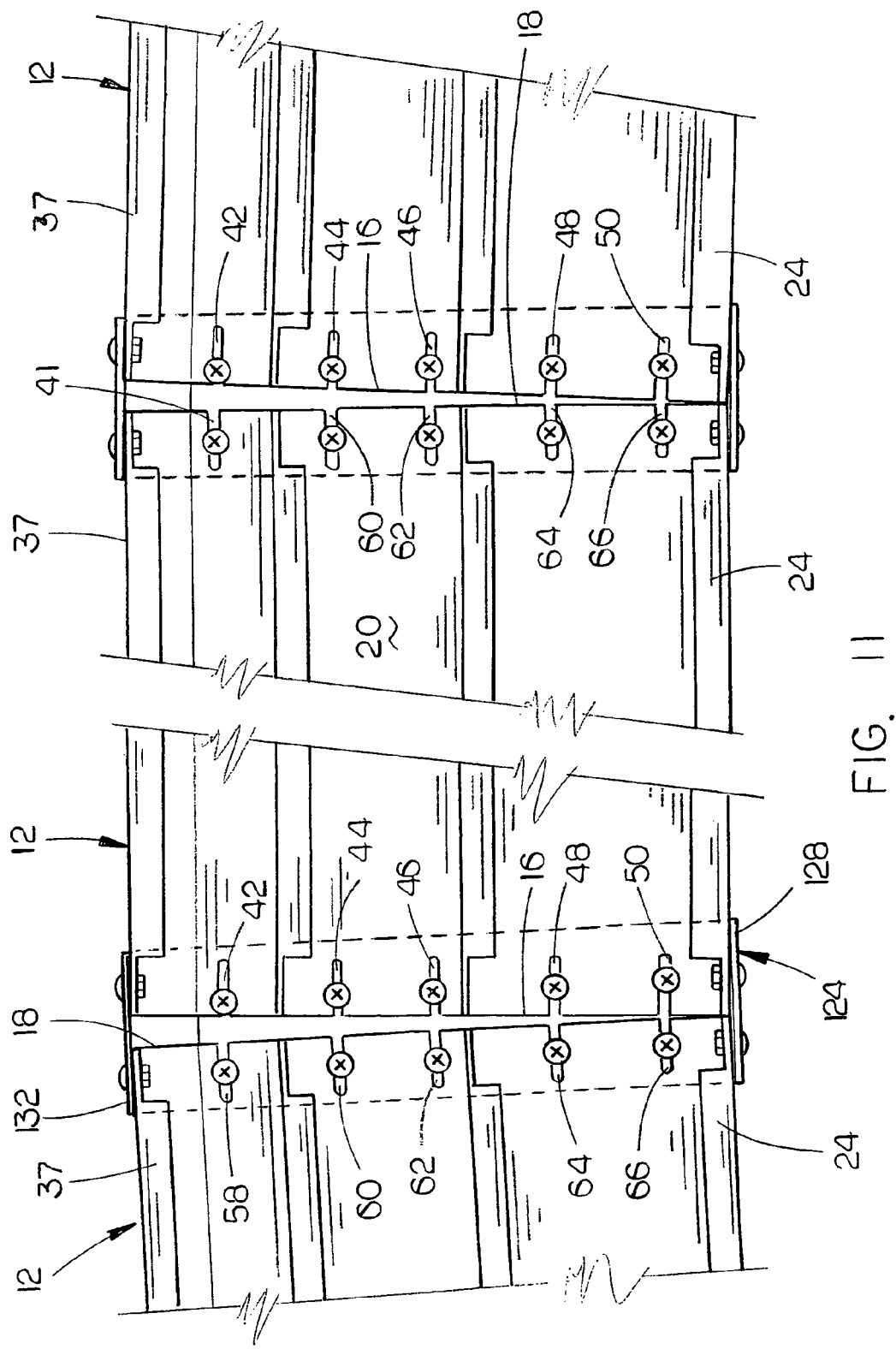
FIG. 11 is a partial top view of the cable tray apparatus of the co-pending application illustrating the manner in which the cable trays thereof are selectively horizontally adjustably secured together in an end-to-end relationship.
Figure 12:
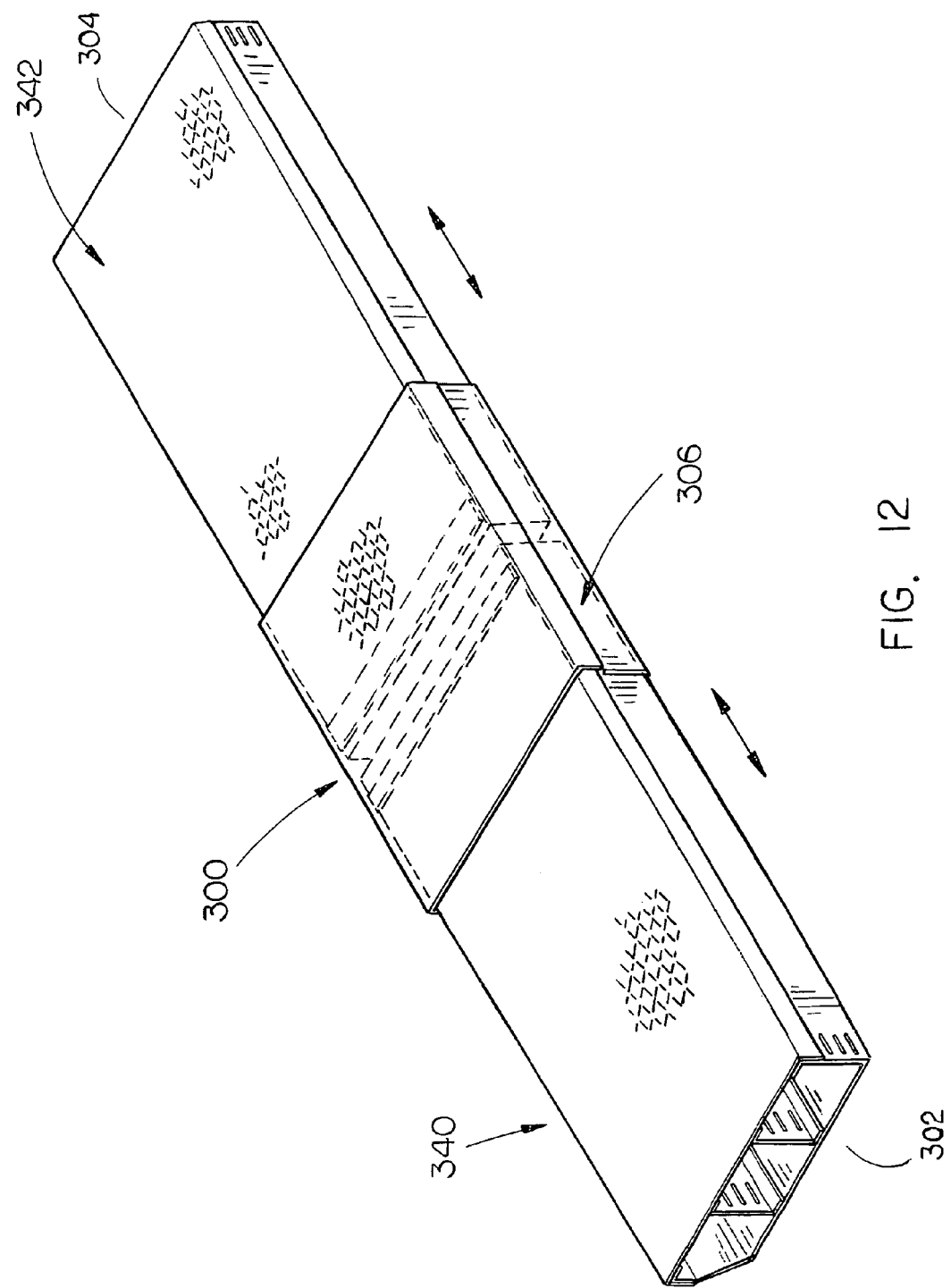
FIG. 12 is perspective view of the expansion joint of this invention.

The connector plates 112, 118 and 124 permit the cable trays 12 to be secured to one another in an end-to-end relationship but also permit the cable trays 12 to be selectively vertically adjusted with respect to one another to correspond to roadways which are inclined either upwardly or downwardly and to permit the cable trays 12 to be selectively horizontally adjusted with respect to one another to correspond to roadways which turn either right or left such as in curves. The connector plates 112, 118 and 124 and their connection to the partitions 72, 74 and the body portion 14 permit horizontal and vertical displacement between adjacent cable trays 12. FIG. 10 illustrates the manner in which the cable trays 12 may be selectively vertically adjusted with respect to one another while FIG. 11 illustrates the manner in which the cable trays 12 may be selectively laterally horizontally adjusted with respect to one another. As seen, such movement is achieved by certain of the screws and studs being slidably received by slots.

The numeral 300 refers to the cable tray expansion joint which is positioned between a first cable tray 12 of the co-pending application and a second cable tray 12 of the co-pending application to safely absorb the heat-induced expansion and contraction of the cable trays at either end of the expansion joint. A plurality of the expansion joints 300 will be utilized along the length of the cable trays of the people mover system. Expansion joint 300 will be described as having a first end 302 and a second end 304. End 302 of expansion joint 300 will have structure provided thereon identical to that shown at the left side of FIG. 5 to enable end 302 to be selectively vertically and horizontally laterally adjustably secured to end 18 of cable tray 12 to compensate for roadway elevation changes and curvature respectively. Similarly, end 304 of expansion joint 300 will have structure provided thereon identical to that shown at the right side of FIG. 5 to enable end 304 to be selectively vertically and horizontally laterally adjustably secured to end 16 of cable tray 12 to compensate for roadway elevation changes and curvature respectively.

Expansion joint 300 includes a bottom support member 306 having a bottom wall 308, an upstanding first side wall 310, an upstanding second side wall 312, a first end 314 and a second end 316. Side wall 312 is shaped to match side wall 32 of body portion 14. A flat slider plate or sheet member 318 formed of Nylon, plastic or other suitable material is positioned on the upper surface of bottom wall 308 and is secured thereto by any convenient means such as screws or the like.

Figure 13:
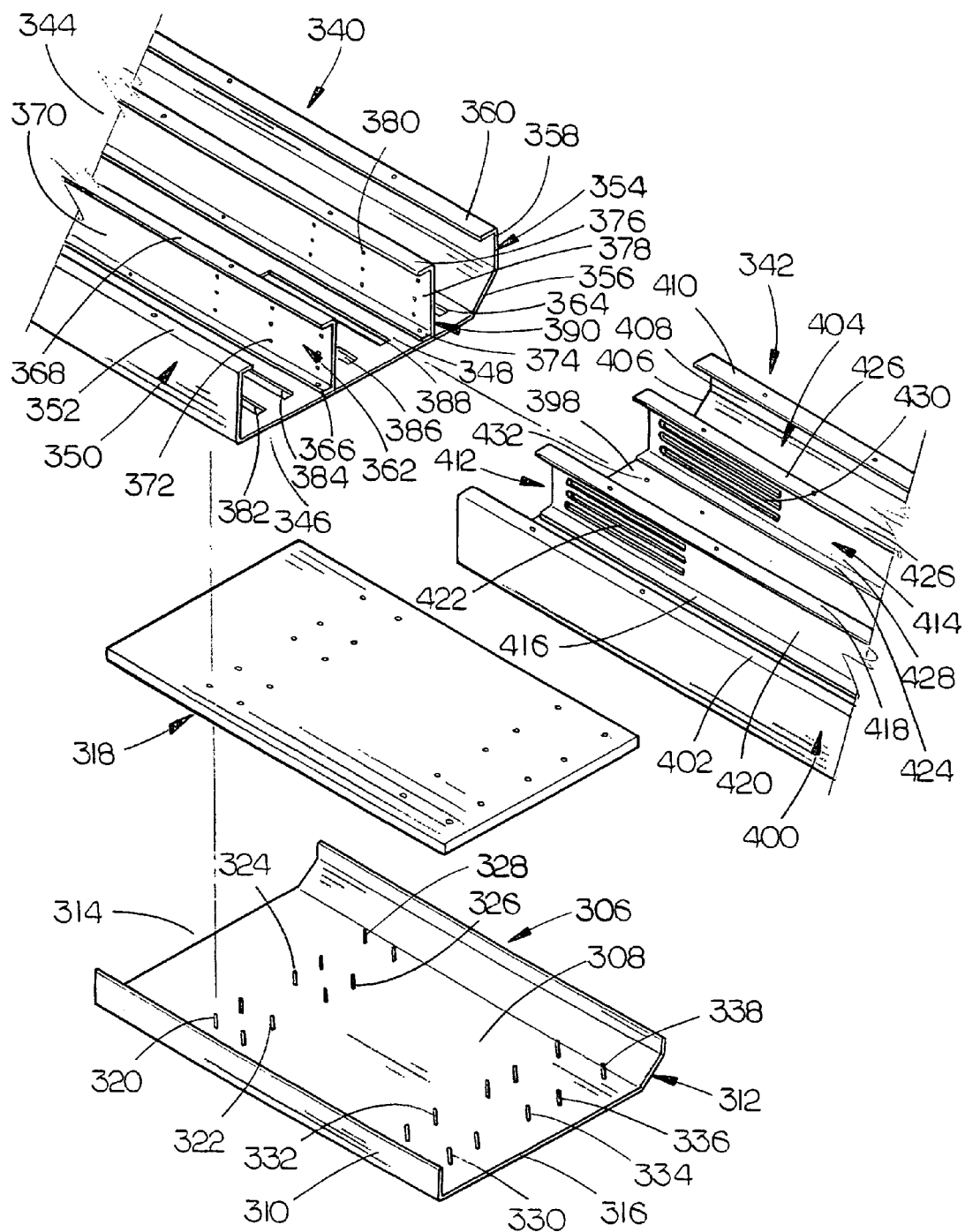
FIG. 13 is partial exploded perspective view of the expansion joint of this invention.
Figure 14:
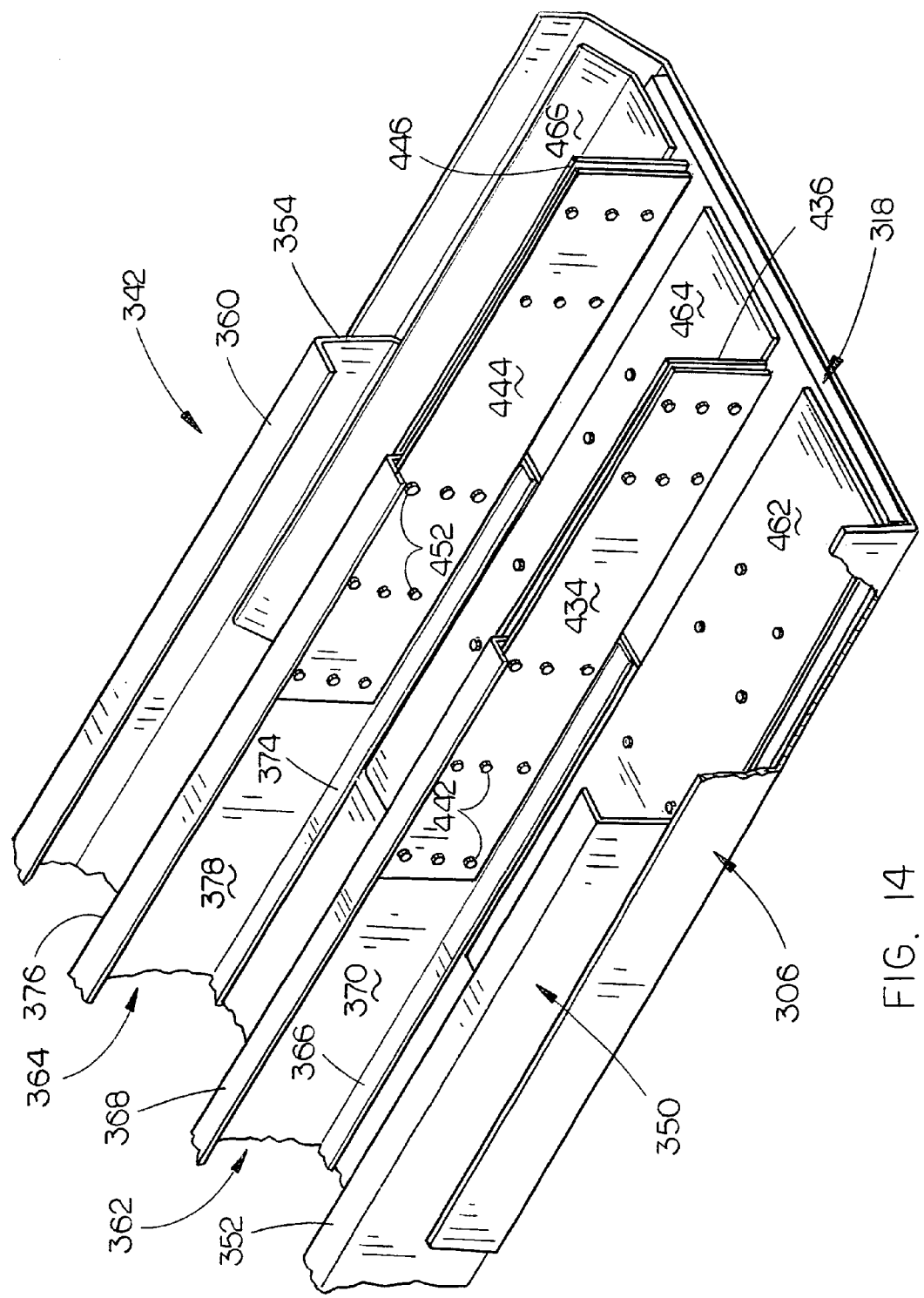
FIG. 14 is a partial perspective view of a portion of the expansion joint of this invention with portions thereof cut-away to more fully illustrate the invention.

Five pairs of threaded studs are secured to bottom wall 308 and extend upwardly through registering openings in slider plate 318 as seen in FIG. 13. For purposes of description, the pairs of studs are numbered 320, 322, 324, 326 and 328 with these pairs of studs being positioned inwardly of end 314 of bottom support member. Five other pairs of threaded studs are secured to bottom wall 308 and extend upwardly therefrom inwardly of end 316 through registering openings formed in slider plate 318. For purposes of description, those pairs of studs are numbered 330, 332, 334, 336 and 338.

Expansion joint 300 also includes a first body portion 340 and a second body portion 342, each of which have the same general shape as body portion 14 of cable tray 12. Body portion 340 includes opposite ends 344 and 346. Body portion 340 includes a bottom wall 348, an upstanding side wall 350 having an inwardly extending flange 352 at its upper end. Body portion 340 is also provided with a side wall 354 which includes an angularly disposed wall portion 356 and a vertically disposed wall portion 358 which has an inwardly extending and horizontally disposed flange 360 at its upper end. Side walls 350 and 354 match side walls 22 and 32 of body portion 14 of the cable trays 12 respectively.

A pair of spaced-apart upstanding partitions 362 and 364 is secured to bottom wall 348 between side walls 350 and 354 as seen in FIG. 13. The partitions 362 and 364 are aligned with partitions 72 and 74 of the adjacent cable tray 12. Partition 362 is channel-shaped in cross-section and includes a bottom flange 366, a top flange 368, and a web 370 extending therebetween. Bottom flange 366 is secured to bottom wall 348 by a plurality of rivets or screws. A plurality of openings 372 are provided in web 370 inwardly of end 346 of body portion 340 as seen in FIG. 13.

Partition 364 is channel-shaped in cross-section and includes a bottom flange 374, a top flange 376, and a web 378 extending therebetween. Bottom flange 374 is secured to bottom wall 348 by a plurality of rivets or screws. A plurality of openings 380 are provided in web 378 inwardly of end 346 of body portion 340 as seen in FIG. 13. Longitudinally extending slots 382 and 384 are formed in bottom wall 348 between side wall 350 and partition 362 at end 346 of body portion 340. Longitudinally extending slots 386 and 388 are formed in bottom wall 348 between partitions 362 and 364 adjacent end 346 of body portion 340. A longitudinally extending slot 390 is formed in bottom wall 348 between partition 390 and side wall 354.

Body portion 342 includes opposite ends 394 and 396. Body portion 342 includes a bottom wall 398, an upstanding side wall 400 having an inwardly extending flange 402 at its upper end. Body portion 342 is also provided with a side wall 404 which includes an angularly disposed wall portion 406 and a vertically disposed wall portion 408 which has an inwardly extending and horizontally disposed flange 410 at its upper end. Side walls 400 and 404 match side walls 22 and 32 of body portion 14 of the cable trays 12.

Figure 15:
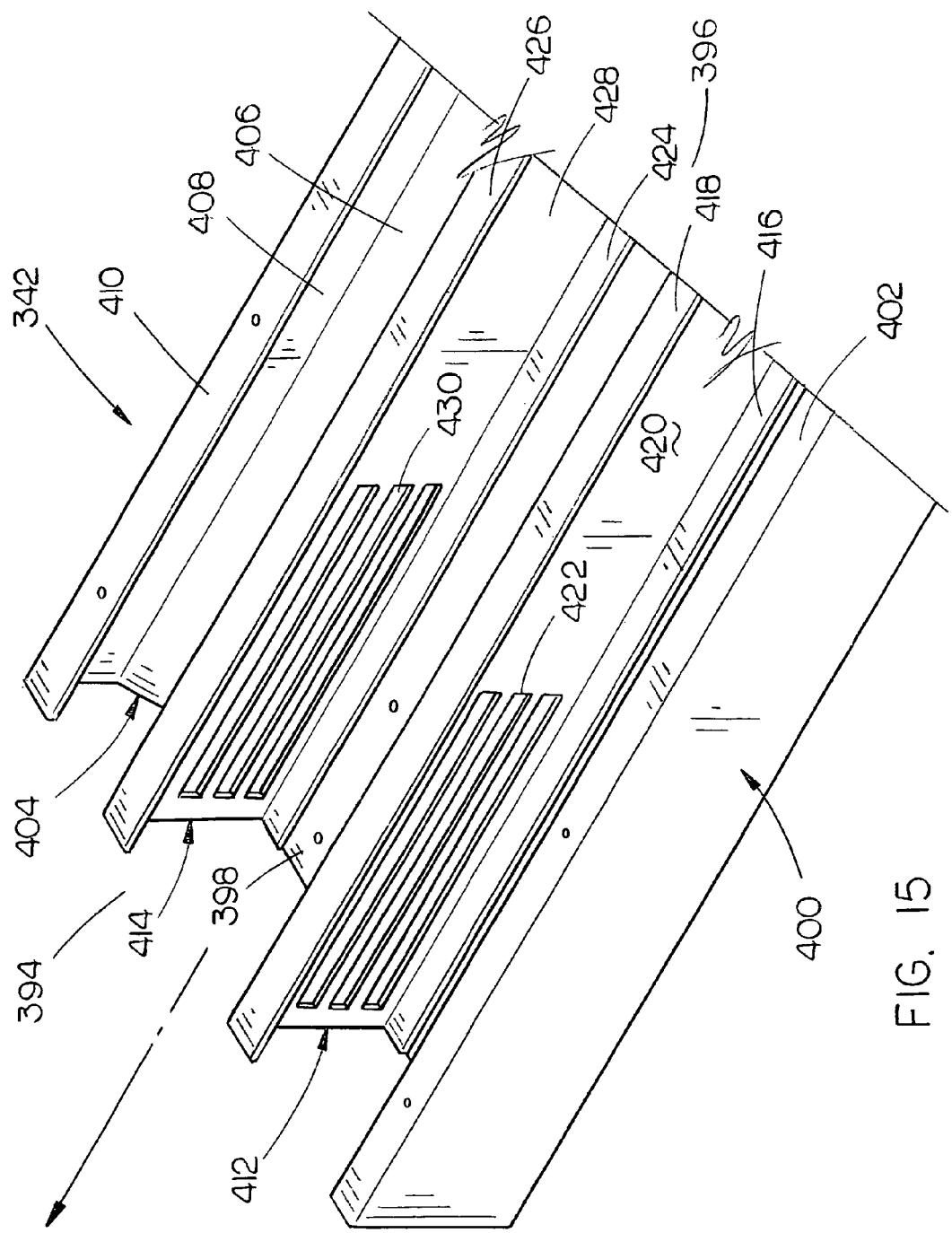
FIG. 15 is a partial perspective view of the first end of the second body portion of the expansion joint of this invention.

A pair of spaced-apart upstanding partitions 412 and 414 is secured to bottom wall 398 between side walls 400 and 404 as seen in FIG. 15. The partitions 412 and 414 are aligned with partitions 72 and 74 of the adjacent cable tray 12. Partition 412 is channel-shaped in cross-section and includes a bottom flange 416, a top flange 418, and a web 420 extending therebetween. Bottom flange 416 is secured to bottom wall 398 by a plurality of rivets or screws. Web 420 has a plurality of horizontally disposed slots 422 formed therein adjacent end 394 of body portion 342 as seen in FIG. 15.

Partition 414 is channel-shaped in cross-section and includes a bottom flange 424, a top flange 426, and a web 428 extending therebetween. Bottom flange 424 is secured to bottom wall 398 by a plurality of rivets or screws. Web 428 has a plurality of horizontally disposed slots 430 formed therein adjacent end 394 of body portion 414.

Body portion 340 is positioned on the slider plate 318 at end 314 so that studs 320 extend upwardly, through slot 382, studs 322 extend upwardly through slot 384, studs 324 extend upwardly through slot 386, studs 326 extend upwardly through slot 388, and so that studs 328 extend upwardly through slot 390. Body portion 342 is then positioned on the slider plate 318 at end 316 so that the studs 330, 332, 334, 336 and 338 extend upwardly through the openings 432 formed in bottom wall 398 of body portion 342.

A pair of flat connector plates 434 and 436 embrace web 370 of partition 362 and are secured thereto by threaded studs 438 which extend from plate 436, through the openings 372 in web 370, and through the openings 440 formed in connector plate 434. Nuts 442 are secured to the studs 438 to securely attach plates 434 and 436 to web 370 of partition 362.

A pair of flat connector plates 444 and 446 embrace web 378 of partition 364 and are secured thereto by threaded studs 448 which extend from plate 446, through the openings 380 formed in web 378, and through the openings 450 formed in connector plate 444. Nuts 452 are secured to the studs 448 to securely attach plates 444 and 446 to web 378 of partition 364.

Figure 16:
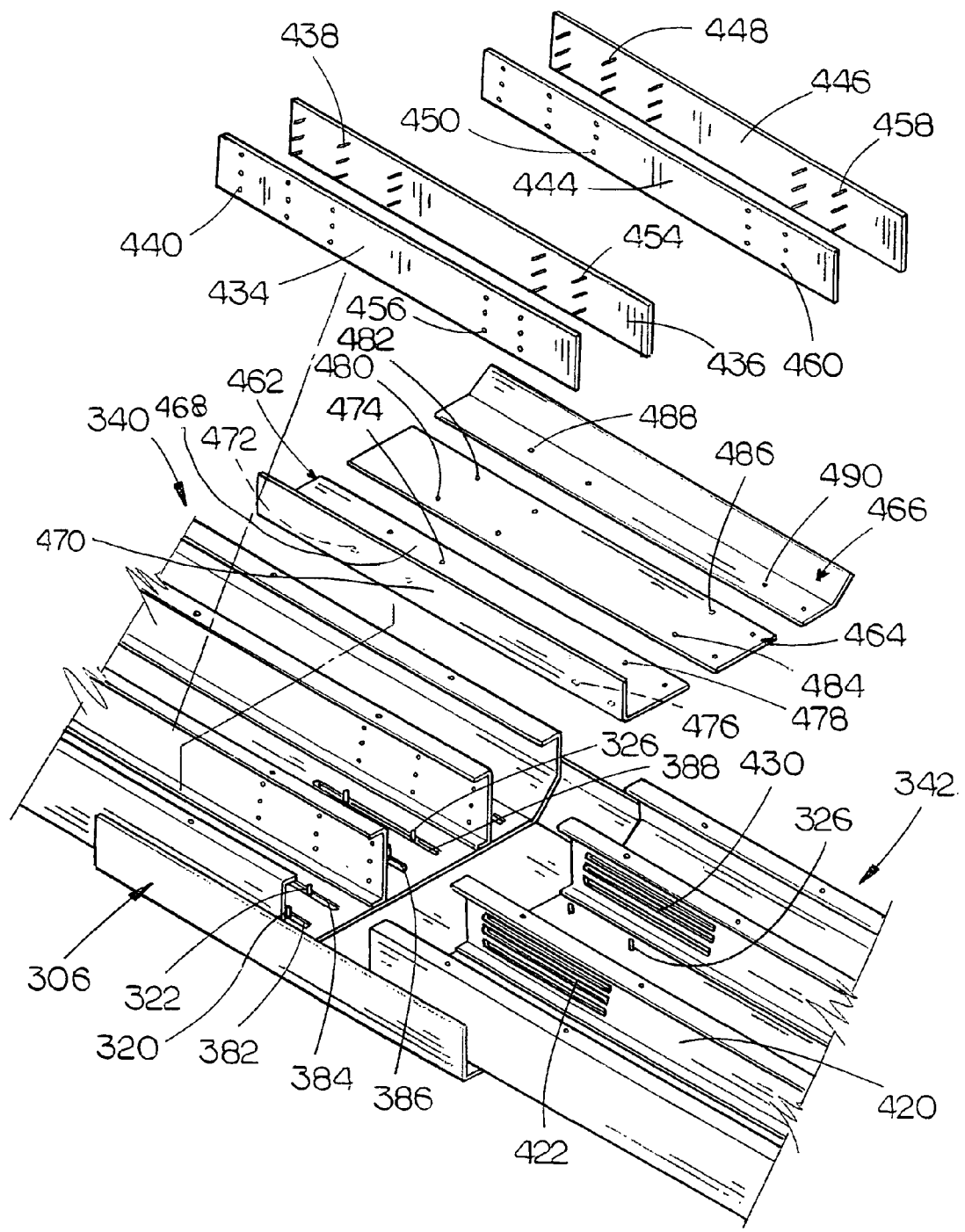
FIG. 16 is a partial exploded perspective view of the expansion joint of this invention.
Figure 17:
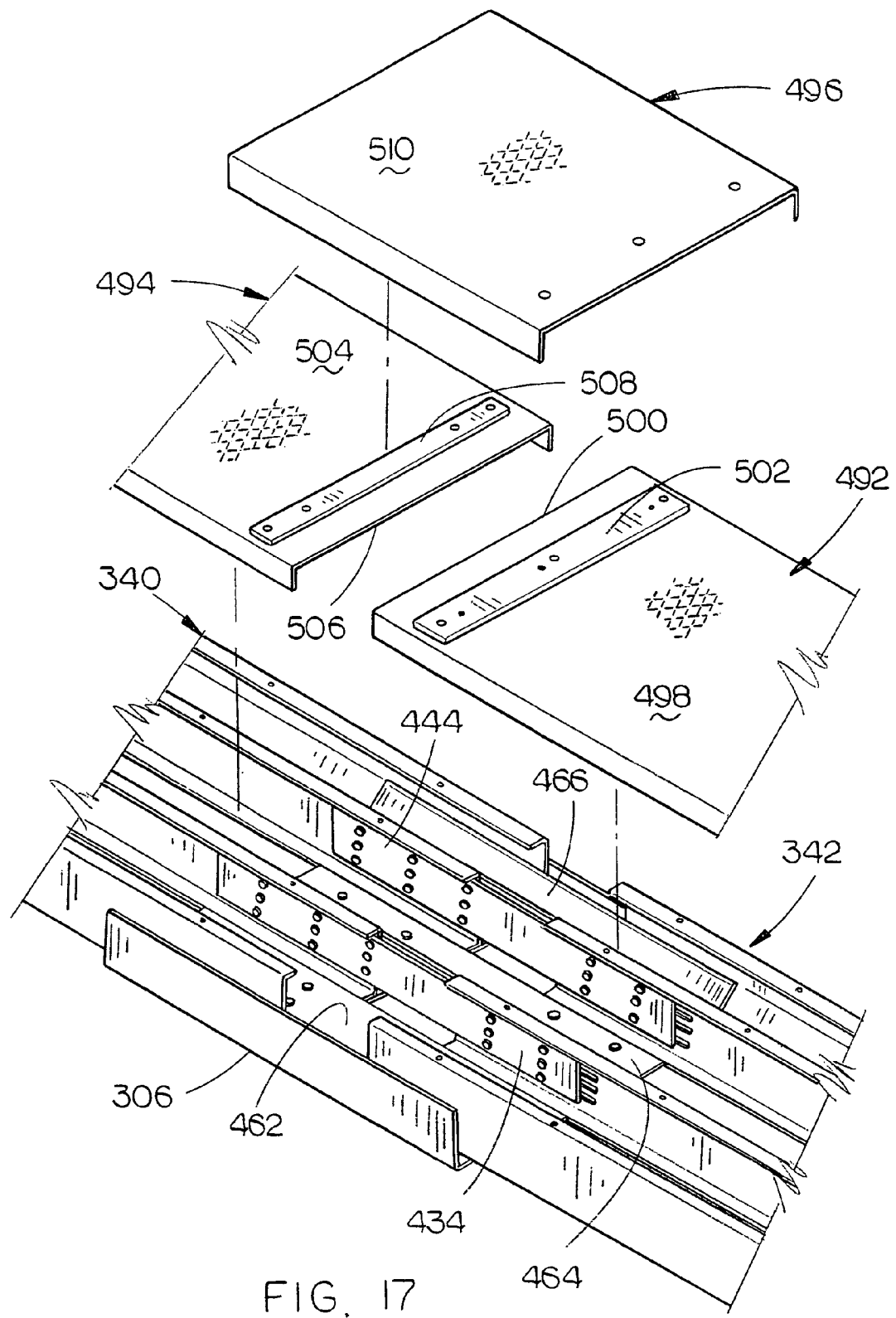
FIG. 17 is a partial exploded perspective view of the expansion joint of this invention.
Figure 18:
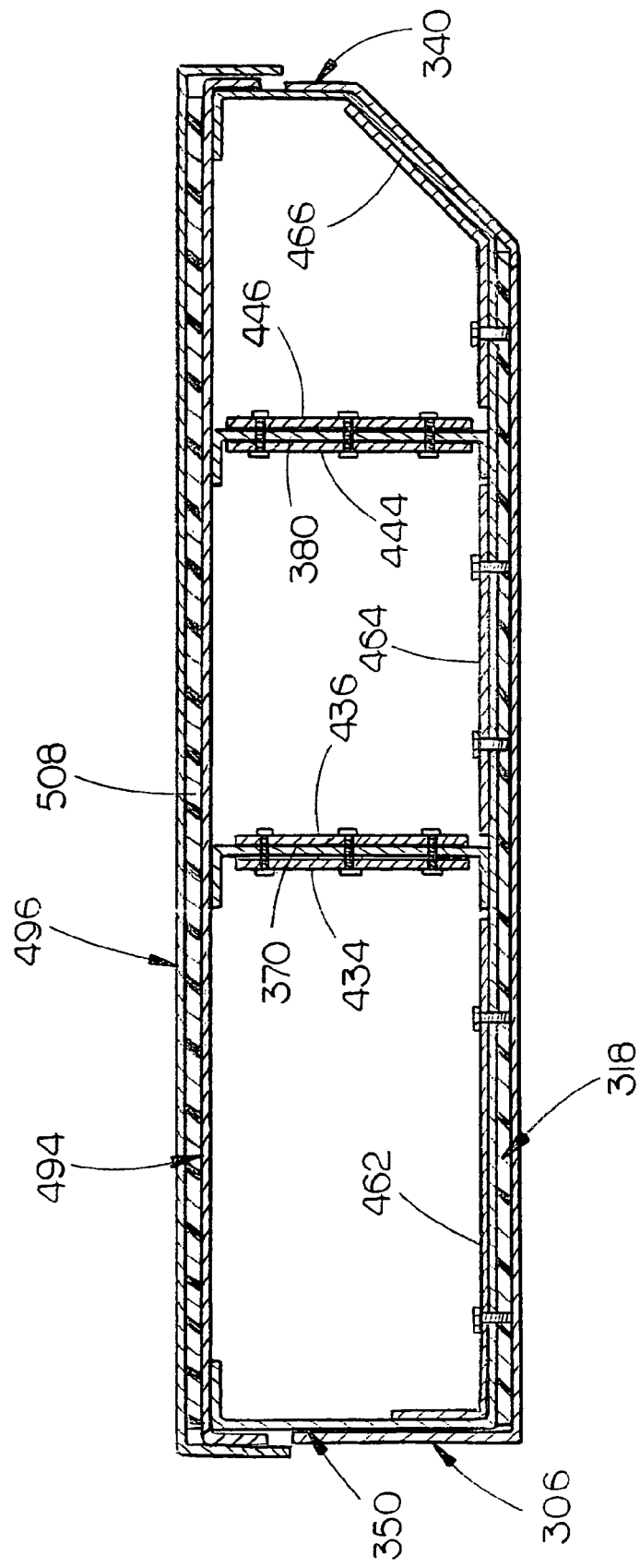
FIG. 18 is a sectional view of the expansion joint of this invention.
Figure 19:
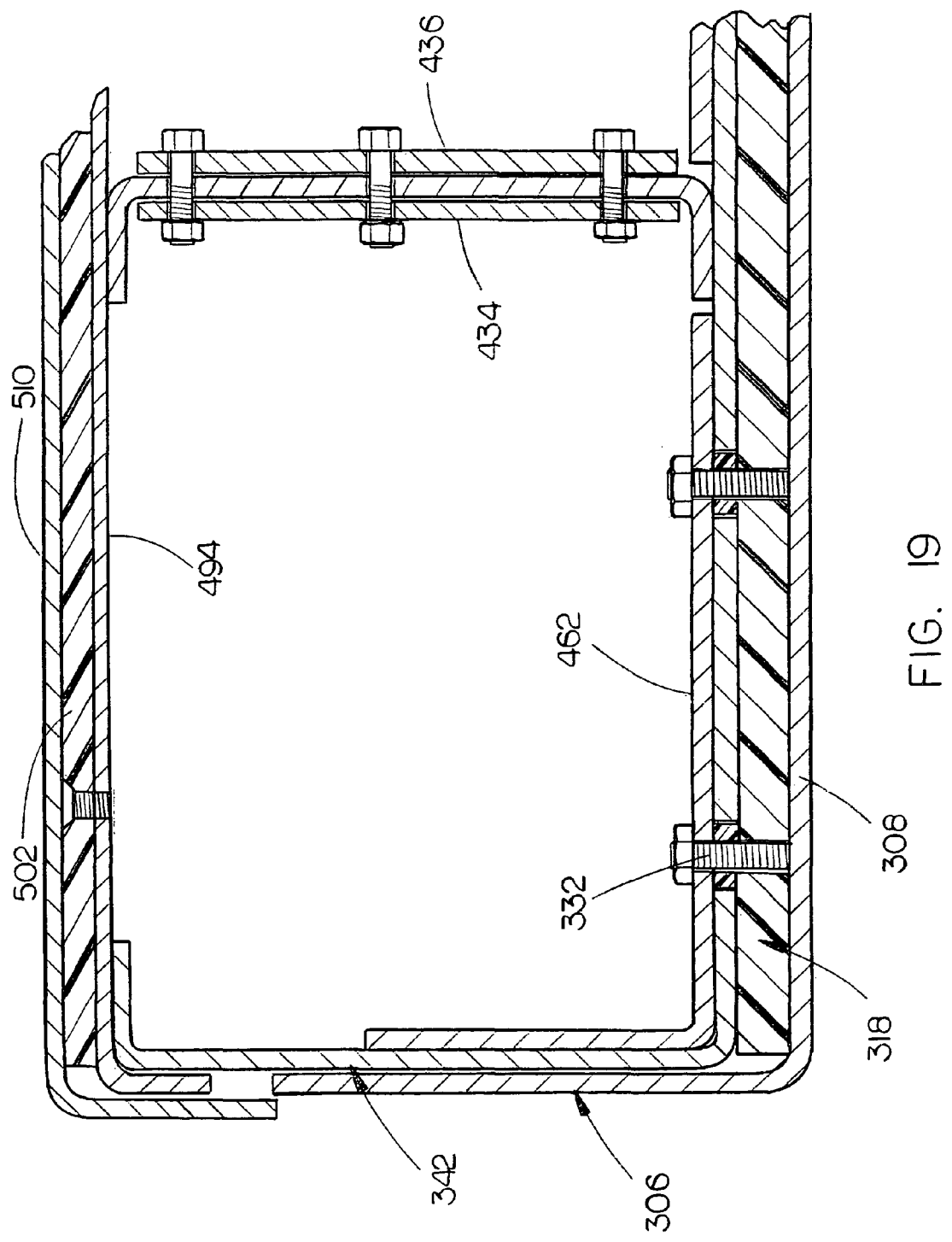
FIG. 19 is a partial sectional view of the expansion joint.

As seen in FIG. 16, plate 436 has threaded studs 454 extending therefrom and plate 434 has openings 456 formed therein which register with the studs 454 as will be described hereinafter. As also seen in FIG. 16, plate 446 has threaded studs 458 extending therefrom and plate 444 has openings 460 formed therein which register with the studs 458 as will be described hereinafter.

The right hand end of plates 434 and 436, as viewed in FIG. 16, slidably embrace the web 420 of partition 412 of body portion 342 so that the studs 454 of plate 436 are slidably received by the slots 422 and extend through the openings 456 in plate 434. Nuts are then threaded onto the ends of the studs 454. The right hand end of plates 444 and 446, as viewed in FIG. 16, slidably embrace the web 428 of partition 414 so that the studs 458 of plate 446 are slidably received by slots 430 and extend through the openings 460 in plate 444. Nuts are then threaded onto the ends of the studs 458. Thus, the slots 382, 384, 386, 388 and 390 with the studs 320, 322, 324, 326 and 328 being slidably therein respectively permit body portions 340 and 342 to slidably move on the slider plate 318 towards or away from one another to serve as an expansion joint. The above-described movement is possible also due to the fact that the studs 454 and 458 are slidable within the slots 422 and 430 respectively. The connector plates 434 and 446 lend stability to the joint.

It is preferred that the studs 320, 322, 324, 326, 328, 330, 332, 334, 336 and 338, the upper ends of which protrude upwardly from the bottom walls of the body portions 340 and 342, be covered or prevented from contacting the cables extending through the expansion joint which could damage the cables. It is to that end that the cover plates 462, 464 and 466 are provided.

Cover plate 462 is angular-shaped in section and includes a bottom wall 468 and an outer wall 470. Bottom wall 468 has a first pair of openings 472, a second pair of openings 474, a third pair of openings 476 and a fourth pair of openings 478 formed therein. The first pair of openings 472 receives the pair of studs 320 extending upwardly through slot 382. The second pair of openings 474 receive the pair of studs 322 extending upwardly through slot 384. The third pair of openings 476 receive the studs 330. The fourth pair of openings 478 receive the studs 332. Plate 462 is positioned between partitions 362 and wall 350 and between partition 412 and wall 400.

Plate 464 has first, second, third and fourth pairs of openings 480, 482, 484 and 486 openings formed therein. Plate 464 is positioned between partitions 362 and 364 and between the partitions 412 and 414. The openings 480 receive the studs 324 with the openings 482 receiving the studs 326. The openings 484 receive the studs 334 with the openings 486 receiving the studs 336.

Plate 466 has a first pair of openings 488 and a second pair of openings 490 formed therein. The plate 466 is positioned between partition 364 and wall 354 and between partition 414 and wall 404. The openings 488 receive the studs 328 and the openings 490 receive the studs 338. Nuts are threadably mounted on the upper ends of the studs just described to mount the plates 462, 464 and 466 in the body portions 340 and 342.

The numerals 492, 494 and 496 refer to covers as will now be described. Cover 492 includes a top wall 498 with an inner end 500. A spacer strip 502 is secured to cover 492 and extends transversely thereacross inwardly of end 500. Cover 492 is positioned over body portion 342 and is secured thereto by screws so that the inner end 500 is positioned directly above the inner end of body portion 342. Cover 494 includes a top wall 504 with an inner end 506. A slider strip 508 is secured to cover 494 and extends transversely thereacross adjacent end 506. Cover 494 is positioned over body portion 340 and is secured thereto for movement therewith by screws, so that its inner end 506 is positioned directly above the inner end of body portion 340.

Cover 496 is secured to cover 492 and body portion 492 by screws so that its top wall 510 is positioned over the juncture of the inner ends of cover 492 and 494. If body portion 342 moves away from body portion 340, cover 496 extends over the gap between body portions 342 and 340. If body portion 340 moves away from body portion 342, cover 496 extends over the gap between body portions 340 and 342.

During construction of the cable tray apparatus of the co-pending application, one or more of the expansion joints 300 will be inserted into the apparatus between adjacent cable trays 12. When the expansion joint 300 is initially installed, the body portions 340 and 342 will initially be spaced-apart in predetermined distances depending upon the ambient temperature at that time. It is imperative that the adjacent ends of the body portions 340 and 342 be initially separated so that if the cable tray apparatus expands due to heat, the body portions 340 and 342 will be able to move towards one another. In use, if the cable tray apparatus is subjected to low temperatures, the cable tray apparatus may longitudinally contract which is made permissible by the sliding connection of the body portions 340 and 342. If the cable tray apparatus is subjected to intense heat, the body portions 340 and 342 may move towards one another to prevent damage to the system.

Thus it can be seen that a novel expansion joint has been provided for a cable tray system for a people mover system which permits the cable tray system to either expand or contract in length due to temperature changes. Further, it can be seen that the expansion joint of this invention may be horizontally laterally adjustably connected to adjacent cable trays and which may be vertically adjustably connected to adjacent cable trays. It can therefore be seen that the expansion joint of the invention accomplishes at least all of its stated objectives.

The invention claimed is:

1. In combination with an electric train which travels along a power rail positioned on a roadway; comprising:
first and second generally rectangular electrical cable trays;
each of said first and second cable trays having first and second ends;
said second end of said first cable tray being positioned adjacent said first end of said second cable tray so that said first and second cable trays are positioned in an end-to-end relationship;
a generally rectangular cable tray expansion joint having first and second ends;
said cable tray expansion joint being positioned between said second end of said first cable tray and said first end of said second cable tray;

said first end of said cable tray expansion joint being secured to said second end of said first cable tray;

said second end of said cable tray expansion joint being secured to said first end of said second cable tray;

said cable tray expansion joint comprising:
  a. a generally horizontally disposed rectangular bottom support member having a bottom wall, an upstanding first side wall, an upstanding second side wall, a first end and a second end;
  b. a flat slider plate positioned on said bottom all and secured thereto:
  c. a plurality of first threaded studs extending upwardly from said bottom wall through said slider plate inwardly of said first end of said bottom wall;
  d. a plurality of second threaded studs extending upwardly from said bottom wall through said slider plate inwardly of said second end of said bottom wall;
  e. a generally horizontally disposed rectangular first body portion having a bottom wall, an upstanding first side wall, an upstanding second side wall, at least one upstanding partition between said first and second side walls, a first end and a second end;
  f. said first end of said first body portion being secured to said second end of said first cable tray;
  g. said first body portion having a plurality of longitudinally extending slots formed in said bottom wall thereof inwardly of said second end of said first body portion;
  h. said second end of said first body portion being longitudinally slidably mounted on said slider plate by said first threaded studs extending upwardly through said slots in said bottom wall of said first body portion;
  i. a generally horizontally disposed rectangular second body portion having a bottom wall, an upstanding first side wall, an upstanding second side wall, at least one upstanding partition between said first and second side walls, a first end and a second end;
  j. said second end of said second body portion being secured to said the first end of said second cable tray;
  k. said first end of said second body portion being fixedly mounted on said slider plate by said second threaded studs extending upwardly through said bottom wall of said second body portion;
  l. said partition of said second body portion having a plurality of longitudinally extending slots formed therein inwardly of said first end of said second body portion;
  m. a first, vertically disposed flat connector plate having first and second ends;
  n. said first end of said first connector plate being fixedly secured to said partition of said first body portion;
  o. said second end of said first connector plate being longitudinally slidably secured to said longitudinally extending slots formed in said partition of said second body portion;
  p. a first cover plate selectively removably secured to said first body portion for movement therewith which extends between the upper ends of said first and second side walls thereof between said first and second ends thereof;
  q. a second cover plate selectively removably secured to said second body portion for movement therewith which extends between the upper ends of said first and second side walls thereof between said first and second ends thereof;
  r. and a third cover plate secured to said second body portion at said first end thereof which is positioned on said second cover plate and which extends from said first end of said second body portion over said first cover plate to cover any gap between said first and second body portions caused by expansion and contraction of said first and second cable trays.

2. The combination of claim 1 wherein said first and second cable trays are selectively laterally horizontally adjustable with respect to one another and are selectively vertically adjustable with respect to one another to correspond to curves in the roadway and to elevational changes in the roadway respectively and wherein said cable tray expansion joint is selectively laterally horizontally adjustable and selectively vertically adjustable with respect to said first cable tray and is selectively laterally horizontally adjustable and selectively vertically adjustable to said second cable tray.

3. The combination of claim 1 further including at least one flat plate, having first and second ends; said first end of said flat plate being positioned on the upper surface of said bottom wall of said first body portion with said first studs extending upwardly therethrough, said second end of said flat plates being positioned on the upper surface of said bottom wall of said second body portion with said second studs extending upwardly therethrough.

4. The combination of claim 3 wherein a plurality of the flat plates extend between said first and second body portions.

5. The combination of claim 3 wherein nuts are threadably mounted on the upper ends of the threaded studs to cover the same.

* * * * *